US012276800B2

(12) United States Patent
Choi et al.

(10) Patent No.: US 12,276,800 B2
(45) Date of Patent: Apr. 15, 2025

(54) WEARABLE DEVICE FOR ADJUSTING LIGHT TRANSMITTANCE ACCORDING TO ILLUMINANCE OF EXTERNAL LIGHT SOURCE, AND METHOD FOR CONTROLLING SAME

(71) Applicant: Samsung Electronics Co., Ltd., Suwon-si (KR)

(72) Inventors: Kyusik Choi, Suwon-si (KR); Seungnyun Kim, Suwon-si (KR); Dongil Son, Suwon-si (KR); Jongmin Yoon, Suwon-si (KR); Seungjoo Lee, Suwon-si (KR); Gisoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/498,610

(22) Filed: Oct. 31, 2023

(65) Prior Publication Data

US 2024/0160024 A1 May 16, 2024

Related U.S. Application Data

(63) Continuation of application No. PCT/KR2023/017021, filed on Oct. 30, 2023.

(30) Foreign Application Priority Data

Nov. 3, 2022 (KR) .................. 10-2022-0145318
Nov. 14, 2022 (KR) .................. 10-2022-0152026

(51) Int. Cl.
| | |
|---|---|
| *G02B 27/01* | (2006.01) |
| *G02B 27/00* | (2006.01) |
| *G02F 1/167* | (2019.01) |
| *G02F 1/1677* | (2019.01) |
| *G02F 1/1685* | (2019.01) |
| *G06F 1/16* | (2006.01) |
| *G06F 3/01* | (2006.01) |
| *G09G 3/00* | (2006.01) |

(52) U.S. Cl.
CPC ..... *G02B 27/0172* (2013.01); *G02B 27/0093* (2013.01); *G06F 1/163* (2013.01);
(Continued)

(58) Field of Classification Search
CPC .......... G09G 3/001–003; G09G 2360/14–144
See application file for complete search history.

(56) References Cited

U.S. PATENT DOCUMENTS

| | | | | |
|---|---|---|---|---|
| 5,004,785 | A | * | 4/1991 | Ida ...................... G02B 5/0278 525/305 |
| 9,740,009 | B2 | * | 8/2017 | Fujimaki ............ G02B 27/0172 |

(Continued)

FOREIGN PATENT DOCUMENTS

| | | |
|---|---|---|
| JP | 2017-523481 A | 8/2017 |
| KR | 10-2013-0141058 A | 12/2013 |

(Continued)

OTHER PUBLICATIONS

International Search Report and Written Opinion dated Feb. 2, 2024, issued in International Patent Application No. PCT /KR2023/ 017021.

*Primary Examiner* — Patrick F Marinelli
(74) *Attorney, Agent, or Firm* — Jefferson IP Law, LLP

(57) ABSTRACT

A wearable device configured to adjust light transmittance according to illuminance of an external light source and a method for controlling the same are provided. The wearable device includes at least one camera, at least one lens, and at least one processor, wherein the at least one processor may be configured to identify illuminance information of an image obtained through the at least one camera, determine a location on the at least one lens, based on the identified illuminance information, the location corresponding to the illuminance information, determine an average illuminance of the image, based on the illuminance information corresponding to the determined location, and compare illumi-
(Continued)

nance information corresponding to the determined location with the average illuminance, and partially adjust light transmittance of the at least one lens, based on a result of the comparison.

20 Claims, 12 Drawing Sheets

(52) U.S. Cl.
CPC .............. *G06F 3/011* (2013.01); *G06F 3/013* (2013.01); *G09G 3/003* (2013.01); *G02B 2027/0118* (2013.01); *G02B 2027/0138* (2013.01); *G02B 2027/0178* (2013.01); *G02F 1/167* (2013.01); *G02F 1/1677* (2019.01); *G02F 1/1685* (2019.01); *G09G 2320/0686* (2013.01); *G09G 2354/00* (2013.01); *G09G 2360/141* (2013.01)

(56) References Cited

U.S. PATENT DOCUMENTS

| | | | |
|---|---|---|---|
| 9,898,995 B2* | 2/2018 | Kim | G02B 27/017 |
| 10,281,745 B2 | 5/2019 | Knoll | |
| 10,419,711 B2* | 9/2019 | Mikayama | H04N 5/58 |
| 10,714,047 B2* | 7/2020 | Kim | G02B 27/0172 |
| 11,087,715 B2* | 8/2021 | Park | G09G 5/10 |
| 11,287,651 B2 | 3/2022 | Rao et al. | |
| 11,868,524 B2* | 1/2024 | Kim | G06F 3/013 |
| 2013/0147859 A1* | 6/2013 | Kobayashi | G09G 5/10 |
| | | | 345/690 |
| 2015/0049003 A1* | 2/2015 | Fujimaki | G02B 27/0172 |
| | | | 345/8 |
| 2016/0216514 A1 | 7/2016 | Hue et al. | |
| 2018/0130444 A1* | 5/2018 | Myong | G09G 3/002 |
| 2019/0189078 A1* | 6/2019 | Kim | G02B 27/0172 |
| 2020/0251070 A1* | 8/2020 | Park | G02B 27/01 |
| 2021/0405402 A1 | 12/2021 | Cheng et al. | |
| 2024/0160024 A1* | 5/2024 | Choi | G02B 27/017 |

FOREIGN PATENT DOCUMENTS

| | | |
|---|---|---|
| KR | 10-2014-0046645 A | 4/2014 |
| KR | 10-2015-0140251 A | 12/2015 |
| KR | 10-1923162 B1 | 11/2018 |
| KR | 10-2020-0095985 A | 8/2020 |
| KR | 10-2020-0106871 A | 9/2020 |
| KR | 10-2021-0006894 A | 1/2021 |
| KR | 10-2021-0120470 A | 10/2021 |
| KR | 10-2435724 B1 | 8/2022 |
| WO | 2022/114307 A1 | 6/2022 |

* cited by examiner

WEARABLE DEVICE FOR ADJUSTING LIGHT TRANSMITTANCE ACCORDING TO ILLUMINANCE OF EXTERNAL LIGHT SOURCE, AND METHOD FOR CONTROLLING SAME

CROSS-REFERENCE TO RELATED APPLICATION(S)

This application is a continuation application, claiming priority under § 365(c), of an International application No. PCT/KR2023/017021, filed on Oct. 30, 2023, which is based on and claims the benefit of a Korean patent application number 10-2022-0145318, filed on Nov. 3, 2022, in the Korean Intellectual Property Office, and of a Korean patent application number 10-2022-0152026, filed on Nov. 14, 2022, in the Korean Intellectual Property Office, the disclosure of each of which is incorporated by reference herein in its entirety.

TECHNICAL FIELD

The disclosure relates to a wearable device configured to adjust light transmittance according to illuminance of an external light source, and a method for controlling the same.

BACKGROUND ART

Various services and additional functions provided through electronic devices, for example, portable electronic devices such as augmented reality (AR) glasses, are gradually increasing. To increase the effective value of these electronic devices and satisfy the needs of various users, communication service providers or electronic device manufacturers are competitively developing electronic devices to provide various functions and differentiate themselves from other companies. Accordingly, various functions provided through electronic devices are becoming increasingly sophisticated.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Various devices for adjusting light transmittance of a lens according to an external illuminance have been provided. Devices according to the related art as described above may only adjust the light transmittance of the entirety of the lens according to the external illuminance, but have failed to provide a function of adjusting the light transmittance of a part of the lens, based on the location of an external light source. For example, since the device according to the related art only provides a function of adjusting light transmittance of the entirety of the lens, based on external illuminance, information on a portion of an image having a low amount of light (e.g., a portion of an image having low illuminance) may be provided to a user when the light transmittance of the entirety of the lens is high. However, information on a portion of an image having a large amount of light (e.g., an area where the sun is located in a landscape image) may not be provided to the user.

Aspects of the disclosure are to address at least the above-mentioned problems and/or disadvantages and to provide at least the advantages described below. Accordingly, an aspect of the disclosure is to provide a wearable device for adjusting light transmittance according to illuminance of external light source, and method for controlling same.

Another aspect of the disclosure is to provide a wearable device wherein light transmittance of the part of at least one lens included in the wearable device is controlled (e.g., control the lens such that the light transmittance of an area of the lens corresponding to the area having high illuminance on a captured image is reduced and the light transmittance of an area of the lens corresponding to the area having low illuminance on the captured image is increased) based on a location of an external light source (e.g., a real object) to improve visibility of an external object.

Another aspect of the disclosure is to provide a wearable device wherein the light transmittance of the part of at least one lens included in the wearable device is controlled (e.g., control the lens such that the light transmittance of an area of the lens corresponding to the area having high illuminance on a captured image is reduced and the light transmittance of an area of the lens corresponding to the area having low illuminance on the captured image is increased) based on a location of an external light source (e.g., a real object) to achieve substantially the same effect as High Dynamic Range (HDR) correction without performing HDR correction, thereby reducing the power consumption of the wearable devices.

Another aspect of the disclosure is to provide a method for controlling a wearable device, wherein light transmittance of the part of at least one lens included in the wearable device is controlled (e.g., control the lens such that the light transmittance of an area of the lens corresponding to the area having high illuminance on a captured image is reduced and the light transmittance of an area of the lens corresponding to the area having low illuminance on the captured image is increased) based on a location of an external light source (e.g., a real object) to improve visibility of an external object.

Another aspect of the disclosure is to provide a method for controlling a wearable device, wherein the light transmittance of the part of at least one lens included in the wearable device is controlled (e.g., control the lens such that the light transmittance of an area of the lens corresponding to the area having high illuminance on a captured image is reduced and the light transmittance of an area of the lens corresponding to the area having low illuminance on the captured image is increased) based on a location of an external light source (e.g., a real object) to achieve substantially the same effect as HDR correction without performing HDR correction, thereby reducing the power consumption of the wearable devices.

Additional aspects will be set forth in part in the description which follows and, in part, will be apparent from the description, or may be learned by practice of the presented embodiments.

Technical Solution

In accordance with an aspect of the disclosure, a wearable device is provided. The wearable device includes at least one camera, at least one lens, and at least one processor, wherein the at least one processor may be configured to identify illuminance information of an image obtained through the at least one camera, determine a location on the at least one lens, based on the identified illuminance information, the location corresponding to the illuminance information, determine an average illuminance of the image, based on the illuminance information corresponding to the determined location, and compare the illuminance information corresponding to the determined location with the average illuminance, and adjust light transmittance of a part of the at least one lens, based on a result of the comparison.

In accordance with another aspect of the disclosure, a method for controlling the wearable device is provided. The method includes identifying illuminance information of an image obtained through at least one camera of the wearable device, determining a location on the at least one lens of the wearable device, based on the identified illuminance information, the location corresponding to the illuminance information, determining an average illuminance of the image, based on the illuminance information corresponding to the determined location, comparing the illuminance information corresponding to the determined location with the average illuminance, and adjusting light transmittance of a part of the at least one lens, based on a result of the comparison.

Advantageous Effects

An embodiment of the disclosure may provide a wearable device wherein light transmittance of a part of at least one lens included in the wearable device may be controlled (e.g., control the lens such that the light transmittance of an area of the lens corresponding to the area having high illuminance on a captured image is reduced and the light transmittance of an area of the lens corresponding to the area having low illuminance on the captured image is increased) based on a location of an external light source (e.g., a real object) to improve visibility of an external object.

An embodiment of the disclosure may provide a wearable device wherein the light transmittance of a part of at least one lens included in the wearable device may be controlled (e.g., control the lens such that the light transmittance of an area of the lens corresponding to the area having high illuminance on a captured image is reduced and the light transmittance of an area of the lens corresponding to the area having low illuminance on the captured image is increased) based on a location of an external light source (e.g., a real object) to achieve substantially the same effect as HDR correction without performing high dynamic range (HDR) correction, thereby reducing the power consumption of the wearable devices.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
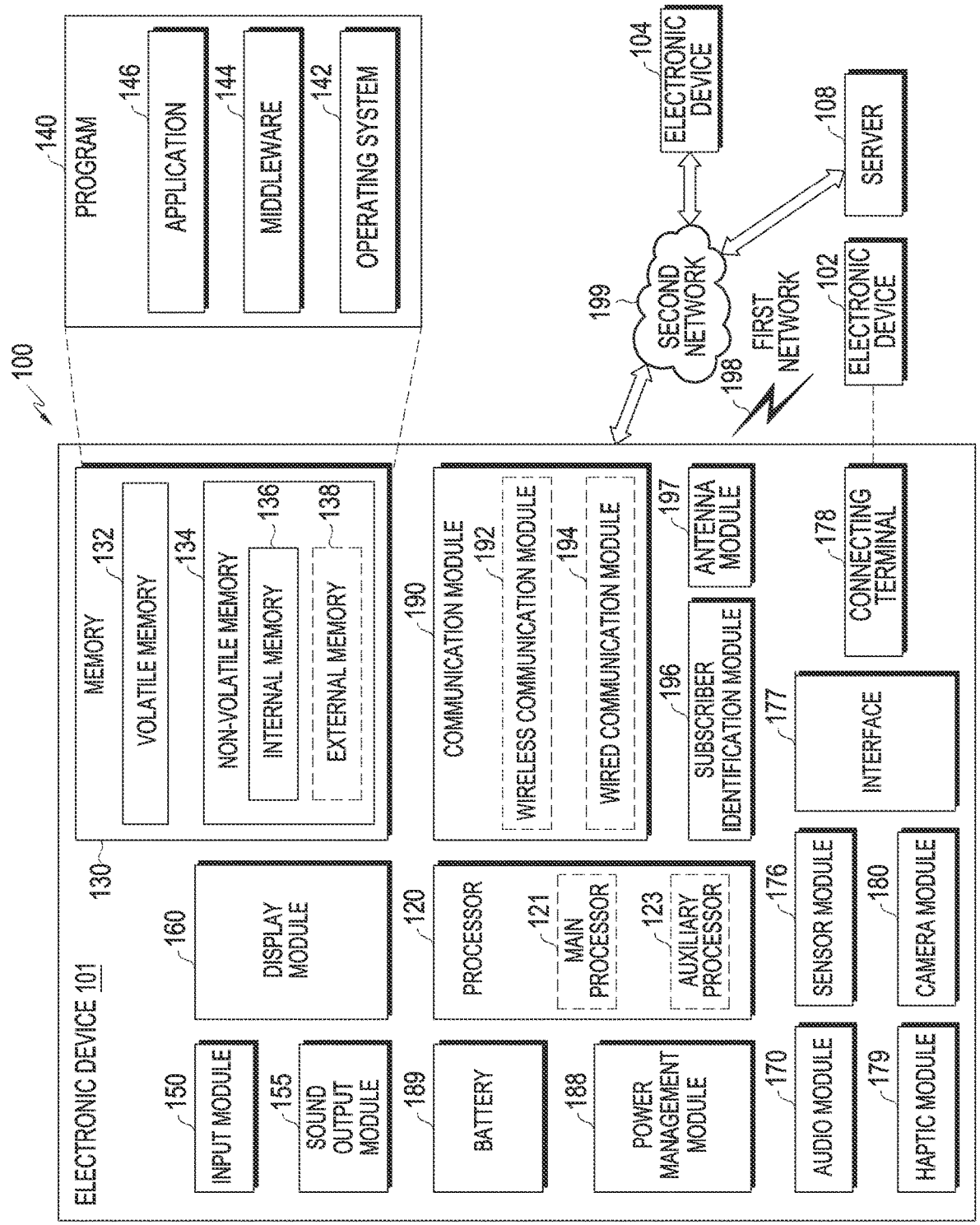
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
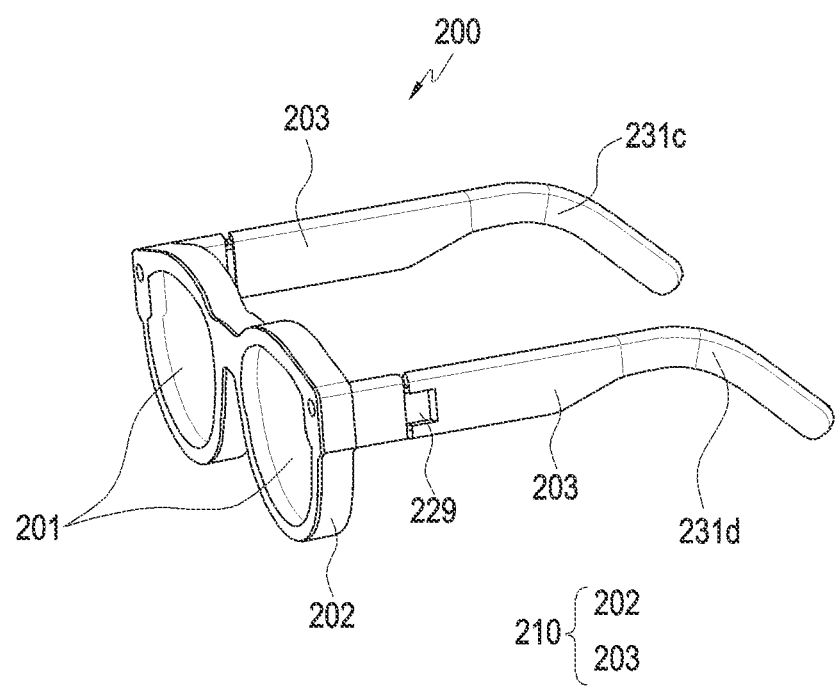
FIG. 2A is a perspective view of an electronic device (e.g., a wearable device) according to an embodiment of the disclosure.

FIG. 2A is a perspective view of a wearable device according to an embodiment of the disclosure.

Referring to FIG. 2A, a wearable device 200 may be an electronic device in the form of glasses, and a user may visually recognize surrounding objects or environments while wearing the wearable device 200. For example, the wearable device 200 is a head mounting device (HMD) or smart glasses capable of providing an image directly in front of the user's eyes. The configuration of the wearable device 200 of FIG. 2A may be the same in whole or in part as the configuration of the electronic device 101 in FIG. 1.

According to various embodiments, the wearable device 200 may include a housing 210 forming the exterior of the wearable device 200. The housing 210 may provide a space allowing components of the wearable device 200 to be disposed. For example, the housing 210 includes a lens frame 202 and at least one wearing member 203.

According to various embodiments, the wearable device 200 may include at least one display member 201 capable of providing visual information to a user. For example, the display member 201 includes a module equipped with a lens or a display, a waveguide, and/or a touch circuit. According to an embodiment, the display member 201 may be transparent or translucent. According to another embodiment, the display member 201 may include glass made of a translucent material or a window member capable of adjusting light transmittance according to color concentration control. According to yet another embodiment, the display members 201 may be provided as a pair and may be disposed to correspond to the left and right eyes of the user while the wearable device 200 is worn on the user's body.

According to various embodiments, the lens frame 202 may accommodate at least a portion of the at least one display member 201. For example, the lens frame 202 is at least partially surround the edge of the display member 201. According to yet another embodiment, the lens frame 202 may position at least one of the display members 201 to correspond to the user's eye. According to yet another embodiment, the lens frame 202 may be the rim of a typical eyeglass structure. According to yet another embodiment, the lens frame 202 may include at least one closed curve surrounding the at least one display member 201.

According to various embodiments, at least one wearing member 203 may extend from the lens frame 202. For example, the wearing member 203 extends from an end of the lens frame 202 and, together with the lens frame 202, is supported or positioned on the user's body (e.g., ear). According to yet another embodiment, the wearing member 203 may be rotatably coupled to the lens frame 202 through a hinge structure 229. According to yet another embodiment, the wearing member 203 may include an inner side surface 231*c* configured to face the user's body and an outer side surface 231*d* opposite to the inner side surface.

According to various embodiments, the wearable device 200 may include at least one hinge structure 229 configured to enable the wearing member 203 to be folded with respect to the lens frame 202. The hinge structure 229 may be disposed between the lens frame 202 and the wearing member 203. In a state in which the wearable device 200 is not worn, the user may carry or store the wearing device 200 by folding the wearing member 203 with respect to the lens frame 202 to be partially overlapped therewith.

Figure 2B:
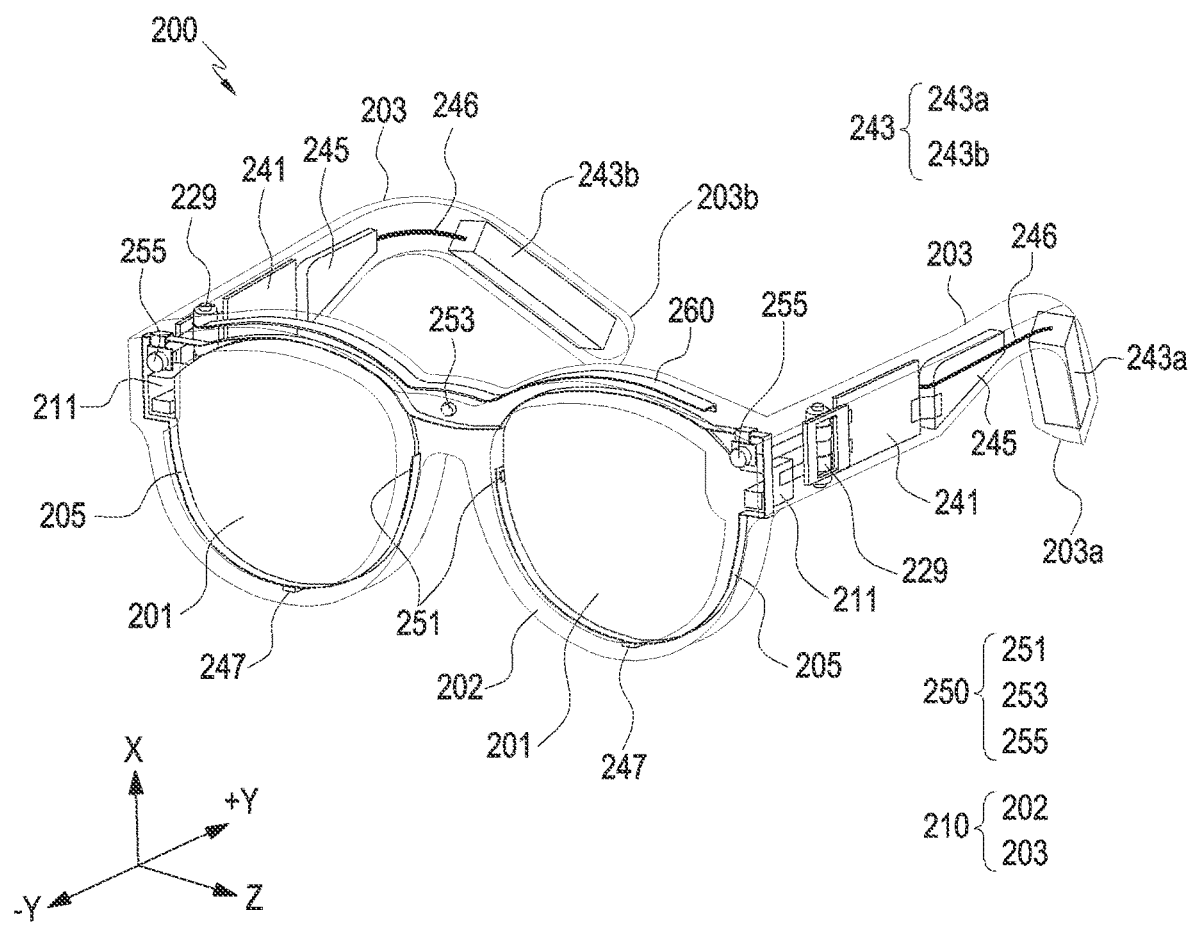
FIG. 2B is a perspective view illustrating an internal configuration of an electronic device (e.g., a wearable device) according to an embodiment of the disclosure.

FIG. 2B is a perspective view illustrating an internal configuration of a wearable device according to an embodiment of the disclosure.

Figure 2C:
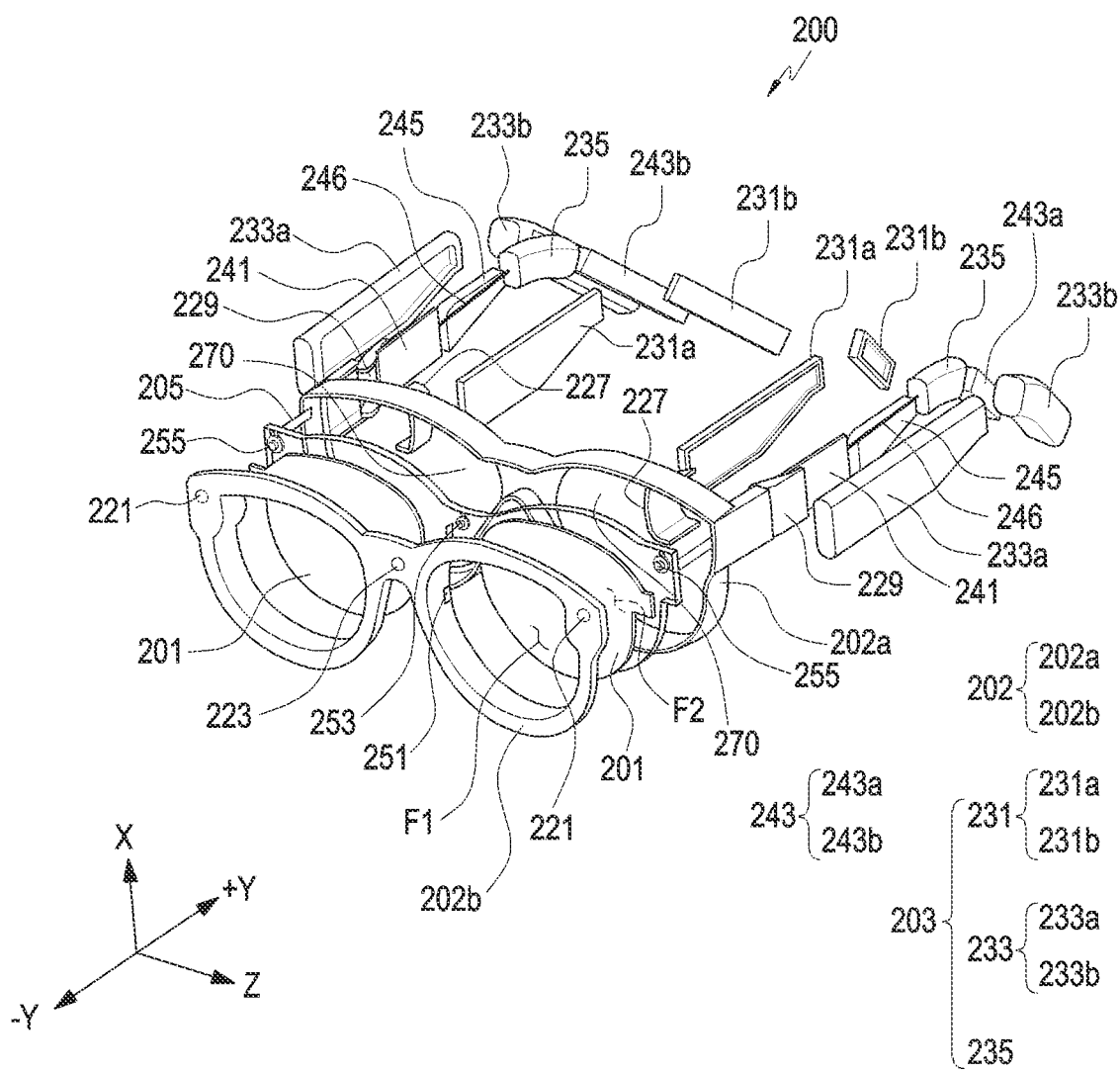
FIG. 2C is an exploded perspective view of an electronic device (e.g., a wearable device) according to an embodiment of the disclosure.

FIG. 2C is an exploded perspective view of a wearable device according to an embodiment of the disclosure.

Referring to FIGS. 2B and 2C, the wearable device 200 may include components (e.g., at least one circuit board 241 (e.g., a printed circuit board (PCB), a printed board assembly (PBA), a flexible PCB (FPCB), or a rigid-flexible PCB (RFPCB)), accommodated in a housing 210, a battery 243, at least one speaker module 245, at least one power transfer structure 246, and a camera module 250. The configuration of the housing 210 of FIG. 2B may be all or partly the same as the configuration of the display member 201, the lens frame 202, the wearing member 203, and the hinge structure 229 of FIG. 2A.

According to various embodiments, the wearable device 200 may obtain and/or recognize visual images of an object or environment in a direction in which the user looks or the wearable device 200 is directed (e.g., the −Y direction), by using the camera module 250 (e.g., the camera module 180 of FIG. 1), and receive information on an object or environment provided by an external electronic device (e.g., the electronic devices 102 and 104 or the server 108 of FIG. 1) through a network (e.g., the first network 198 or the second network 199 of FIG. 1). In another embodiment, the wearable device 200 may provide the provided information on the object or environment to the user in a sound or visual form. The wearable device 200 may provide the provided information on the object or environment to the user through the display member 201 in a visual form by using a display module (e.g., the display module 160 of FIG. 1). For example, the wearable device 200 implements augmented reality by presenting information on an object or environment in a visual form and combining the information with a real image of the user's surrounding environment.

According to various embodiments, the display member 201 may include a first surface (F1) facing in a direction in which external light is incident (e.g., the −Y direction) and a second surface (F2) facing in the opposite direction (e.g., the +Y direction) to the first surface (F1). While the user is wearing the wearable device 200, at least a portion of an image or light incident through the first surface (F1) may pass through the second surface (F2) of the display member 201 disposed to face the left and/or right eyes of the user and enter the user's left eye and/or right eye.

According to various embodiments, the lens frame 202 may include one or more frames. For example, the lens frame 202 includes a first frame 202a and a second frame 202b. According to an embodiment, when the wearable device 200 is worn by the user, the first frame 202a may be a frame corresponding to a portion facing the user's face, and the second frame 202b may be a portion of the lens frame 202 spaced apart from the first frame 202a in a direction of a user's gaze (e.g., the −Y direction).

According to various embodiments, at least one light output module 211 may provide an image and/or video to a user. For example, the light output module 211 includes a display panel (not shown) capable of outputting an image, and lenses (not shown) corresponding to the user's eyes and guiding the image to the display member 201. For example, the user acquires an image output from a display panel of the light output module 211 through a lens of the light output module 211. According to various embodiments, the light output module 211 may include a device configured to display various pieces of information. For example, the light output module 211 includes at least one of a liquid crystal display (LCD), a digital mirror device (DMD), a liquid crystal on silicon (LCoS), an organic light-emitting diode (OLED), or a micro light-emitting diode (micro LED). According to another embodiment, when the light output module 211 and/or the display member 201 includes one of LCD, DMD, and LCoS, the wearable device 200 may include a light source for radiating light to a display area of the light output module 211 and/or the display member 201. According to yet another embodiment, when the light output module 211 and/or the display member 201 include one of an OLED or a micro LED, the wearable device 200 may provide a virtual image to the user without including a separate light source.

According to various embodiments, at least a portion of the light output module 211 may be disposed within the housing 210. For example, the light output module 211 is disposed on the wearing member 203 or the lens frame 202 to correspond to each of the user's right eye and left eye. According to yet another embodiment, the light output module 211 may be electrically and/or operatively connected to the display member 201 and provide an image to a user through the display member 201.

According to various embodiments, at least one circuit board 241 may include components for driving the wearable device 200. For example, the circuit board 241 includes at least one integrated circuit chip, and at least one of the processor 120, the memory 130, the power management module 188, or the communication module 190 of FIG. 1 may be provided on the integrated circuit chip. According to yet another embodiment, the circuit board 241 may be disposed within the wearing member 203 of the housing 210. According to yet another embodiment, the circuit board 241 may be electrically connected to the battery 243 through the power transfer structure 246. According to yet another embodiment, the circuit board 241 may be connected to the flexible printed circuit board 205, and transmit electrical signals to electronic components (e.g., the light output module 211, the camera module 250, and the light-emitting unit (not shown)) of an electronic device through the flexible printed circuit board 205. According to yet another embodiment, the circuit board 241 may be a circuit board including an interposer.

According to various embodiments, at least one flexible printed circuit board 205 may extend from the circuit board 241 to the inside of the lens frame 202 across the hinge structure 229, and be disposed on at least a portion of the circumference of the display member 201 inside the lens frame 202.

According to various embodiments, the battery 243 (e.g., the battery 189 of FIG. 1) may be electrically connected to components (e.g., the light output module 211, the circuit board 241, the speaker module 245, the microphone module 247, and the camera module 250) of the wearable device 200 and supply power to the components of the wearable device 200.

According to various embodiments, at least a portion of the battery 243 may be disposed on the wearing member 203. According to yet another embodiment, the battery 243 may be disposed at the end 203a or 203b of the wearing member 203. For example, the battery 243 includes a first battery 243a disposed at the first end 203a of the wearing member 203, and a second battery 243b disposed at the second end 203b.

According to various embodiments, the speaker module 245 (e.g., the audio module 170 or the sound output module 155 of FIG. 1) may convert an electrical signal into sound. At least a portion of the speaker module 245 may be disposed within the wearing member 203 of the housing 210. According to yet another embodiment, the speaker module 245 may be positioned in the wearing member 203 to correspond to the user's ear. For example, the speaker module 245 is disposed between the circuit board 241 and the battery 243.

According to various embodiments, at least one power transfer structure 246 may transfer power from the battery 243 to an electronic component (e.g., the light output module 211) of the wearable device 200. For example, the power transfer structure 246 is electrically connected to the battery 243 and/or the circuit board 241, and the circuit board 241 may transfer the power received through the power transfer structure 246 to the light output module 211. According to yet another embodiment, the power transfer structure 246 may pass through the speaker module 245 and be connected to the circuit board 241. For example, when viewing the wearable device 200 from the side (e.g., in the Z-axis direction), the power transfer structure 246 is at least partially overlap the speaker module 245.

According to various embodiments, the power transfer structure 246 may be a component capable of transferring power. For example, power transfer structure 246 includes a flexible printed circuit board or wire. For example, the wire includes a plurality of cables (not shown). In various embodiments, the shape of the power transfer structure 246 may be variously modified in consideration of the number and/or type of cables.

According to various embodiments, at least one microphone module 247 (e.g., the input module 150 and/or the audio module 170 of FIG. 1) may convert sound into an electrical signal. According to yet another embodiment, the microphone module 247 may be disposed on at least a portion of the lens frame 202. For example, at least one microphone module 247 is disposed at a lower end (e.g., in a direction toward the −X axis) and/or at an upper end (e.g., in a direction toward the X axis) of the wearable device 200. According to various embodiments, the wearable device 200 may more clearly recognize the user's voice by using voice information (e.g., sound) obtained from the at least one microphone module 247. For example, the wearable device 200 distinguishes voice information from ambient noise, based on acquired voice information and/or additional information (e.g., low-frequency vibration of the user's skin and bones). For example, the wearable device 200 clearly recognizes a user's voice and performs a function of reducing ambient noise (e.g., noise canceling).

According to various embodiments, the camera module 250 may photograph still images and/or moving images. The camera module 250 may include at least one of a lens, at least one image sensor, an image signal processor, or a flash. According to an embodiment, the camera module 250 may be disposed within the lens frame 202 and disposed around the display member 201.

According to various embodiments, the camera module 250 may include at least one first camera module 251. According to an embodiment, the first camera module 251 may capture the trajectory of the user's eyes (e.g., pupils) or gaze. For example, the first camera module 251 may capture a reflection pattern of light emitted from the light-emitting unit to the user's eyes. For example, the light-emitting unit emits light in an infrared band for tracking the trajectory of gaze by using the first camera module 251. For example, the light-emitting unit includes an IR LED. According to yet another embodiment, the processor (e.g., the processor 120 of FIG. 1) may adjust the location of the virtual image such that the virtual image projected on the display member 201 corresponds to the direction in which the user's eyes gaze. According to yet another embodiment, the first camera module 251 may include a global shutter (GS) type camera, and may track the trajectory of the user's eyes or gaze by using the plurality of first camera modules 251 having the same standard and performance.

According to various embodiments, the first camera module 251 may periodically or aperiodically transmit information (e.g., trajectory information) related to the trajectory of the user's eyes or gaze to a processor (e.g., the processor 120 of FIG. 1). According to yet another embodiment, based on the trajectory information, the first camera module 251 may transmit the trajectory information to the processor when the first camera module 251 detects that the user's gaze has changed (e.g., the eyes move more than a reference value while the head is not moving).

According to various embodiments, the camera module 250 may include a second camera module 253. According to yet another embodiment, the second camera module 253 may capture an external image. According to yet another embodiment, the second camera module 253 may be a global shutter type camera or a rolling shutter (RS) type camera. According to yet another embodiment, the second camera module 253 may capture an external image via a second optical hole 223 formed in the second frame 202*b*. For example, the second camera module 253 may include a high resolution color camera and may be a high resolution (HR) or photo video (PV) camera. In addition, the second camera module 253 may provide an auto focus (AF) function and an optical image stabilizer (OIS) function. The second camera module 253 according to an embodiment of the disclosure may include one camera or a plurality of cameras.

According to various embodiments, the wearable device 200 may include a flash (not shown) located adjacent to the second camera module 253. For example, the flash (not shown) provides light for increasing brightness (e.g., illuminance) around the wearable device 200 when the second camera module 253 acquires an external image, and may reduce difficulty in acquiring images due to dark environments, mixing of various light sources, and/or reflections of light.

According to various embodiments, the camera module 250 may include at least one third camera module 255. According to yet another embodiment, the third camera module 255 may photograph a motion of the user through a first optical hole 221 formed in the lens frame 202. For example, the third camera module 255 photographs a user's gesture (e.g., hand motion). The third camera module 255 and/or the first optical hole 221 may be disposed on both side ends of the lens frame 202 (e.g., the second frame 202*b*), for example, both ends of the lens frame 202 (e.g., the second frame 202*b*) in the Z direction. According to yet another embodiment, the third camera module 255 may be a global shutter (GS) type camera. For example, the third camera module 255 is a camera that supports 3 degrees of freedom (3DoF) or 6DoF and may provide 360-degree space (e.g., omnidirectional), positional awareness, and/or movement awareness. According to yet another embodiment, the third camera module 255 is a stereo camera, and may perform movement path tracking function (simultaneous localization and mapping (SLAM)) and user motion recognition function by using a plurality of global shutter type cameras having the same standard and performance. According to yet another embodiment, the third camera module 255 may include an infrared (IR) camera (e.g., a time of flight (TOF) camera or a structured light camera). For example, the IR camera operates as at least a part of a sensor module (e.g., the sensor module 176 of FIG. 1) for detecting a distance to a subject.

According to yet another embodiment, at least one of the first camera module 251 or the third camera module 255 may be replaced with a sensor module (e.g., the sensor module 176 of FIG. 1) (e.g., a light detection and ranging (LiDAR) sensor). For example, the sensor module includes at least one of a vertical cavity surface emitting laser (VCSEL), an infrared sensor, and/or a photodiode. For example, the photodiode includes a positive intrinsic negative (PIN) photodiode or an avalanche photodiode (APD). The photo diode may be referred to as a photo detector or a photo sensor.

According to yet another embodiment, at least one of the first camera module 251, the second camera module 253, and the third camera module 255 may include a plurality of camera modules (not shown). For example, the second camera module 253 includes a plurality of lenses (e.g., wide-angle and telephoto lenses) and image sensors and is disposes on one surface (e.g., the surface facing the −Y axis) of the wearable device 200. For example, the wearable device 200 includes a plurality of camera modules each having a different property (e.g., angle of view) or function, and may control the angle of view of the camera module to be changed based on the user's selection and/or trajectory information. For example, at least one of the plurality of camera modules is a wide-angle camera and at least another one may be a telephoto camera.

According to various embodiments, a processor (e.g., the processor 120 of FIG. 1) may determine the motion of the wearable device 200 and/or the motion of the user by using information of the wearable device 200 acquired using at least one of a gesture sensor, a gyro sensor, or an acceleration sensor of a sensor module (e.g., the sensor module 176 of FIG. 1) and the user's motion (e.g., the user's body's approach to the wearable device 200) obtained using the first camera module 251. According to yet another embodiment, the wearable device 200 may include, in addition to the sensors described above, a magnetic (geomagnetic) sensor capable of measuring azimuth by using a magnetic field and magnetic line of force, and/or a Hall sensor capable of acquiring motion information (e.g., movement direction or movement distance) by using the strength of a magnetic field. For example, the processor determines the motion of the wearable device 200 and/or the motion of the user, based on information obtained from the magnetic (geomagnetic) sensor and/or the Hall sensor.

According to various embodiments (not shown), the wearable device 200 may perform an input function (e.g., a touch and/or pressure sensing function) allowing interaction with a user. For example, an element configured to perform a touch and/or pressure sensing function (e.g., a touch sensor and/or a pressure sensor) is disposed on at least a portion of the wearing member 203. The wearable device 200 may control a virtual image output through the display member 201, based on the information obtained through the element. For example, a sensor related to touch and/or pressure sensing function is configured in various types including the resistive type, capacitive type, electro-magnetic type (EM), or optical type. According to yet another embodiment, an element configured to perform the touch and/or pressure sensing function may be all or partly the same as that of the input module 150 of FIG. 1.

According to various embodiments, the wearable device 200 may include a reinforcing member 260 disposed in the inner space of the lens frame 202 and having a rigidity higher than that of the lens frame 202.

According to various embodiments, the wearable device 200 may include a lens structure 270. The lens structure 270 may refract at least a portion of light. For example, the lens structure 270 may be a prescription lens having a predetermined refractive power. According to yet another embodiment, the lens structure 270 may be disposed behind the second window member of the display member 201 (e.g., in the +Y direction). For example, the lens structure 270 is positioned between the display member 201 and the user's eyes. For example, the lens structure 270 faces one surface of the display member.

According to various embodiments, the housing 210 may include a hinge cover 227 that may conceal a portion of the hinge structure 229. The other portion of the hinge structure 229 may be accommodated or concealed between an inner case 231 and an outer case 233 to be described later.

According to various embodiments, the wearing member 203 may include the inner case 231 and the outer case 233. The inner case 231 may be, for example, a case configured to face the user's body or directly contact the user's body and may be made of a material having low thermal conductivity, for example, synthetic resin. According to yet another embodiment, the inner case 231 may include an inner side surface (e.g., the inner side surface 231*c* of FIG. 2A) facing the user's body. The outer case 233 may include, for example, a material (e.g., a metal material) capable of at least partially transferring heat and may be coupled to face the inner case 231. According to yet another embodiment, the outer case 233 may include an outer side surface (e.g., the outer side surface 231*d* of FIG. 2A) opposite to the inner side surface 231*c*. In an embodiment, at least one of the circuit board 241 or the speaker module 245 may be accommodated in a space separated from the battery 243 within the wearing member 203. In the illustrated embodiment, the inner case 231 may include a first case 231*a* including the circuit board 241 or the speaker module 245, and a second case 231*b* configured to accommodate the battery 243, and the outer case 233 may include a third case 233*a* coupled to face the first case 231*a*, and a fourth case 233*b* coupled to face the second case 231*b*. For example, the first case 231*a* and the third case 233*a* are coupled (hereinafter, referred to as "first case portions 231*a* and 233*a*") to accommodate the circuit board 241 and/or the speaker module 245, and the second case 231*b* and the fourth case 233*b* are coupled (hereinafter, referred to as "second case portions 231*b* and 233*b*") to accommodate the battery 243.

According to various embodiments, the first case parts 231*a* and 233*a* may be rotatably coupled to the lens frame 202 through a hinge structure 229, and the second case parts 231*b* and 233*b* may be connected to or mounted to ends of the first case parts 231*a* and 233*a* through a connection member 235. In some embodiments, a portion of the connection member 235 that comes into contact with the user's body may be made of a material having low thermal conductivity, for example, an elastic material such as silicone, polyurethane, or rubber, and a portion of the connection member 235 that does not come into contact with the user's body may be made of a material (e.g., a metal material) having high thermal conductivity. For example, when heat is generated from the circuit board 241 or the battery 243, the connection member 235 blocks the transfer of heat to a portion in contact with the user's body and disperse or release the heat through the portion that is not in contact with the user's body. According to yet another embodiment, a portion of the connection member 235 configured to come into contact with the user's body may be interpreted as a portion of the inner case 231, and a portion of the connection member 235 that does not come into contact with the user's body may be interpreted as a portion of the outer case 233. According to yet another embodiment (not shown), the first case 231*a* and the second case 231*b* may be configured integrally without the connection member 235, and the third case 233*a* and the fourth case 233*b* may be configured integrally without the connection member 235. According to various embodiments, other components (e.g., the antenna module 197 of FIG. 1) may be further included in addition to the illustrated components, and information on an object or environment may be provided from an external electronic device (e.g., the electronic devices 102 and 104 or the server 108 of FIG. 1) through a network (e.g., the first network 198 or the second network 199 of FIG. 1) by using the communication module 190.

Although only the wearable device 200 has been illustrated and described in FIGS. 2A to 2C, the disclosure is not limited thereto, and some components of the wearable device 200 shown in FIGS. 2A to 2C may also be included in electronic devices such as smart phones and tablet PCs.

Figure 3:
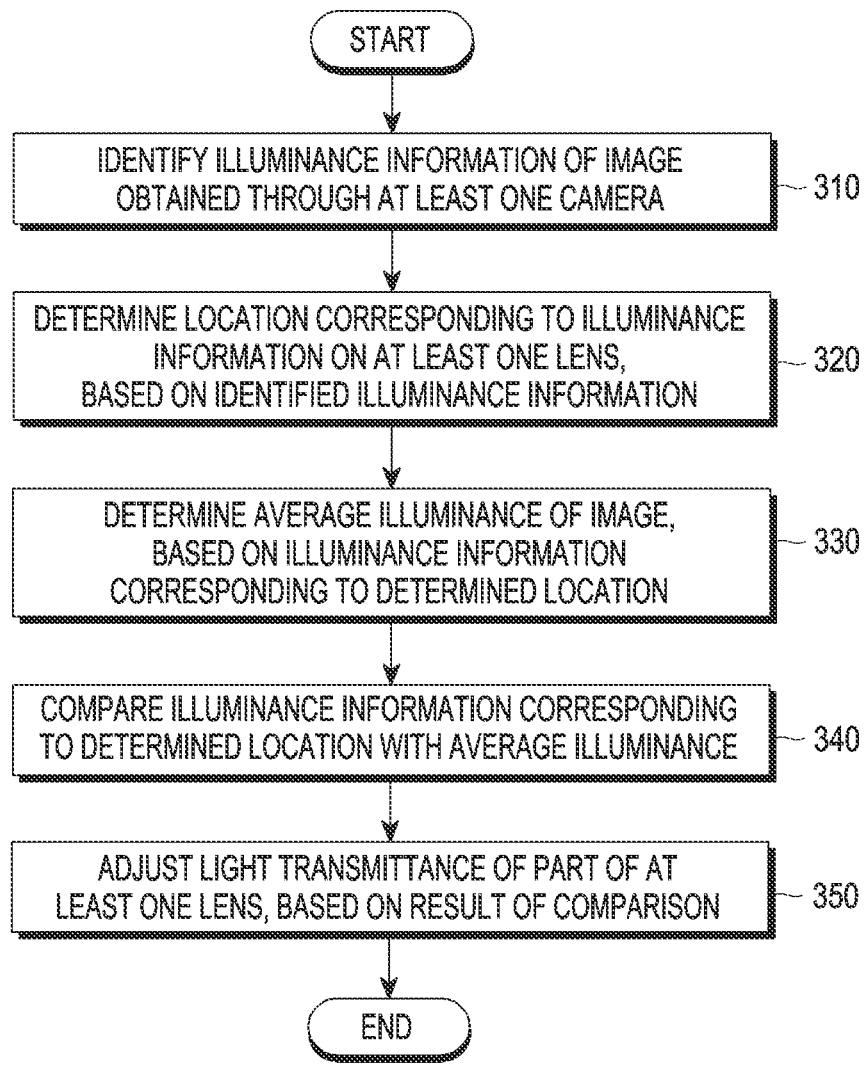
FIG. 3 illustrates a function or operation of a wearable device adjusting light transmittance of a part of at least one lens included in the wearable device according to an embodiment of the disclosure.

FIG. 3 illustrates a function or operation of the wearable device adjusting light transmittance of a part of at least one lens (e.g., the display member 201) included in the wearable device according to an embodiment of the disclosure.

Referring to FIG. 3, in operation 310, the wearable device 200 (e.g., the processor 120) according to an embodiment of the disclosure may identify illuminance information of an image obtained through at least one camera (e.g., the second camera module 253). The wearable device 200 according to an embodiment of the disclosure may identify illuminance information of an image, based on an image histogram of the obtained image. The wearable device 200 according to an embodiment of the disclosure, when a separate illuminance sensor is provided, may also identify illuminance information of an image by mapping illuminance sensing data (e.g., the average value of illuminance sensing values when a plurality of illuminance sensors are provided) obtained from the illuminance sensor and an image obtained by at least one camera (e.g., the second camera module 253) to each other.

Figure 4:
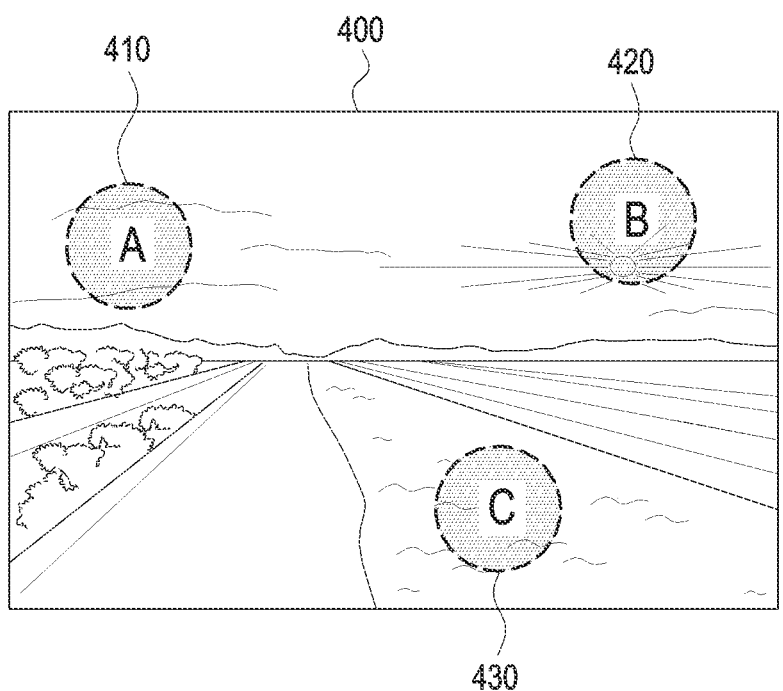
FIG. 4 illustrates a function or operation of a wearable device identifying illuminance information in an image acquired by at least one camera included in the wearable device according to an embodiment of the disclosure.

FIG. 4 illustrates a function or operation of the wearable device identifying illuminance information in an image acquired by at least one camera (e.g., the second camera module 253) included in the wearable device according to an embodiment of the disclosure.

Referring to FIG. 4, the wearable device 200 according to an embodiment of the disclosure may identify a light part and/or a dark part on an acquired image, based on the identified illuminance information. FIG. 4 illustrates a first area (A) 410 and a second area (B) 420 identified as the light parts, and a third area (C) 430 identified as the dark part. The wearable device 200 according to an embodiment of the disclosure may select all of the light and/or dark parts in the image 400 obtained by at least one camera (e.g., the second camera module 253) as areas for determining locations corresponding to illuminance information on at least one lens (e.g., the display member 201). Alternatively, the wearable device 200 according to an embodiment of the disclosure may select some of the light and/or dark parts of the image 400 obtained by at least one camera (e.g., the second camera module 253) as an area for determining a location corresponding to illuminance information on at least one lens (e.g., the display member 201). The image 400 according to an embodiment of the disclosure may correspond to a real world viewed by a user wearing the wearable device 200.

In operation 320, the wearable device 200 (e.g., the processor 120) according to an embodiment of the disclosure, based on the illuminance information identified according to operation 310, may determine a location on at least one lens (e.g., the display member 201) corresponding to the illuminance information.

FIGS. 5A, 5B, 5C, and 5D illustrate a function or operation of the wearable device 200 determining a location on at least one lens (e.g., the display member 201), light transmittance of which is to be adjusted, in order to adjust the light transmittance of the at least one lens (e.g., the display member) included in the wearable device 200 according to various embodiments of the disclosure.

At least one camera (e.g., the second camera module 253) may be provided at the upper end (e.g., the lens frame 202) of each of a plurality of lenses (e.g., the left eye lens and the right eye lens) of the wearable device 200 according to an embodiment of the disclosure. In other words, the wearable device 200 according to another embodiment of the disclosure may include a plurality (e.g., two) of camera modules. In relation to FIGS. 5A to 5D, a function or operation of the wearable device 200 according to yet another embodiment of the disclosure determining a location on at least one lens (e.g., the display member 201), light transmittance of which is to be adjusted, is illustrated based on a case in which the wearable device 200 includes a plurality of camera modules.

Figure 5A:
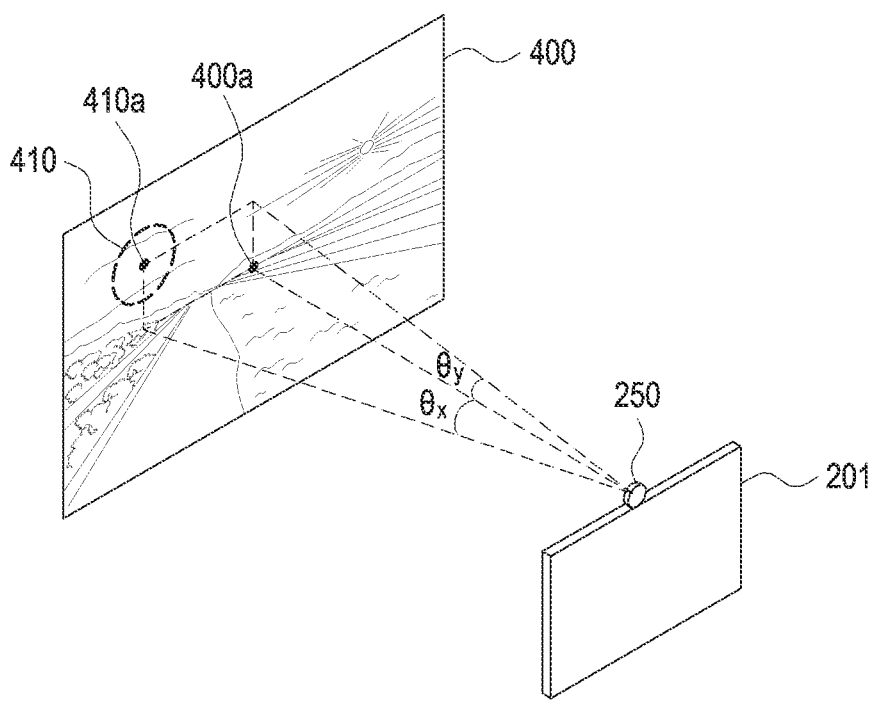
FIGS. 5A, 5B, 5C, and 5D illustrate a function or operation of a wearable device determining a location on at least one lens, light transmittance of which is to be adjusted, in order to adjust the light transmittance of the at least one lens included in the wearable device according to various embodiments of the disclosure.
Figure 5B:
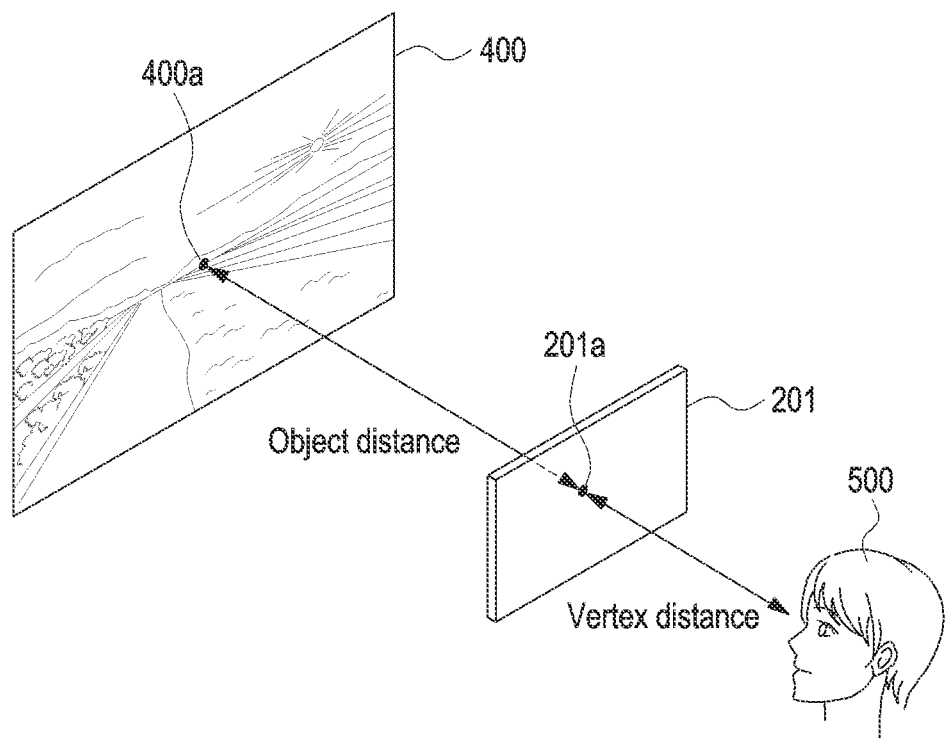
Figure 5C:
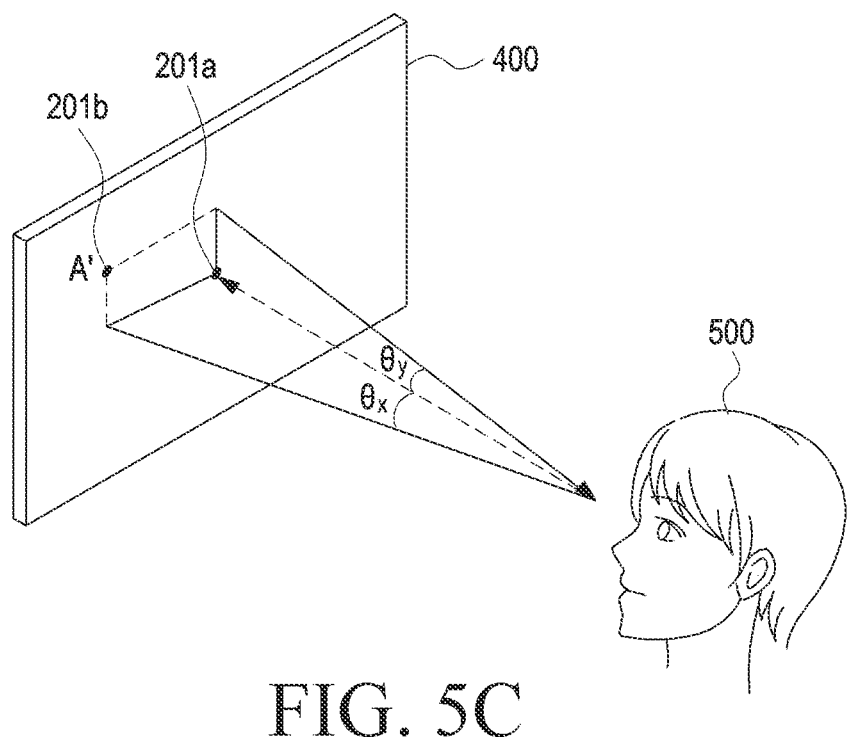
Figure 5D:
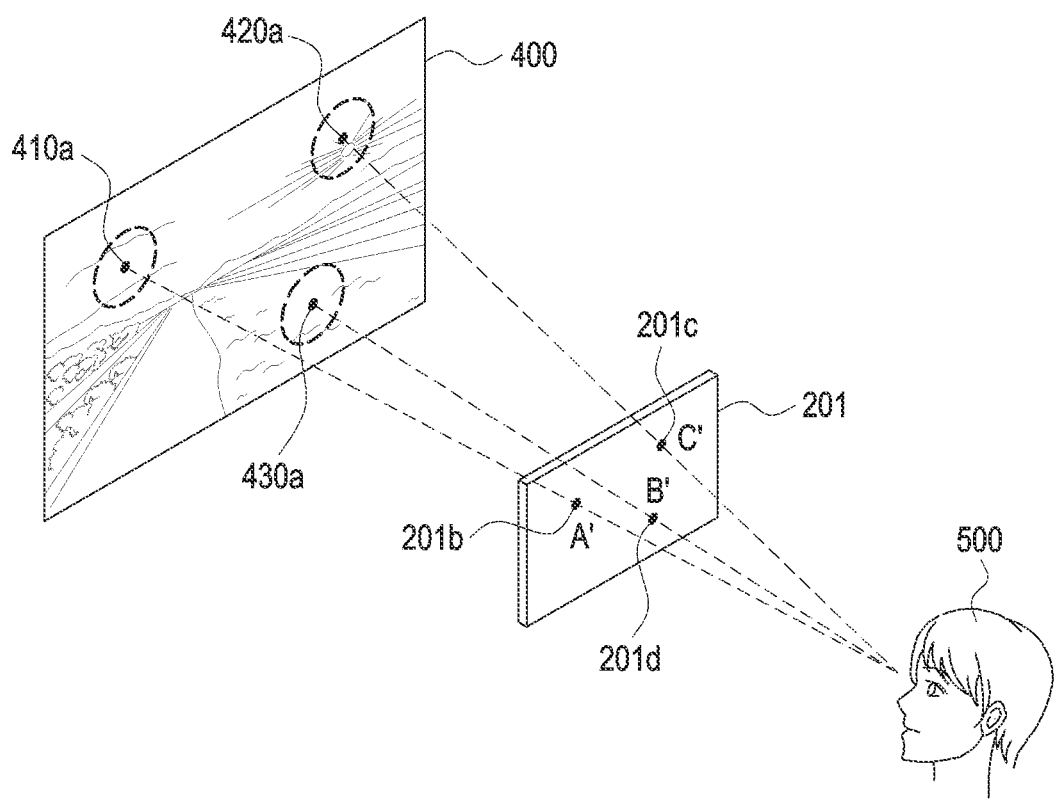

The wearable device 200 according to yet another embodiment of the disclosure may position the image 400, the camera module 250, and the lens (e.g., the left eye lens as the display member 201) in a virtual space such that the center (e.g., the first center 400a) of the image 400 acquired by the at least one camera (e.g., the camera module 250 disposed on the upper end of the left eye lens) and the center of the camera module 250 (e.g., the camera module 250 disposed on the upper end of the left lens) are positioned on a straight line. In this case, as shown in FIG. 5B, the distance (e.g., "object distance") between the lens (e.g., the display member 201) and the image 400 (e.g., a real object) may be much larger than the distance (e.g., "vertex distance") between the eyeball of a user 500 and the lens (e.g., the display member 201). For example, the distance (e.g., "object distance") between the lens (e.g., the display member 201) and the image 400 (e.g., a real object) is infinite, and the distance (e.g., "vertex distance") between the eyeball of the user 500 and the lens (e.g., the display members 201) may be 5 cm. In this case, the center of the camera module 250 may be treated (e.g., processed) as the same as the center (e.g., the second center 201a) of the lens (e.g., the display member 201). Therefore, when allocating illuminance information of the obtained image 400 to the lens (e.g., the display member 201), an angle (e.g., $\hat{e}_x$ and/or $\hat{e}_y$) formed by the center of the camera module 250 and the center (e.g., the third center 410a) of at least one arbitrary point (e.g., the first area 410 (e.g., light part) included in the first area 410 (e.g., light area) may be treated as an angle formed by the center of the lens (e.g., the display member 201) and the center (e.g., the third center 410a) of the first area 410 (e.g., light area). The wearable device 200 according to an embodiment of the disclosure may identify coordinate for an eyeball image of the user 500 acquired using the at least one camera (e.g., the first camera module 251). For example, the wearable device 200 according to an embodiment of the disclosure identifies coordinate for the eyeball image by using, as a starting point, an arbitrary point (e.g., the center of the eyeball image) included in the eyeball image of the user 500 acquired using the at least one camera (e.g., the first camera module 251). For example, the wearable device 200 according to an embodiment of the disclosure is adapted (e.g., to arrange images in virtual space for calculation) to locate the identified coordinate for the eyeball image and the center of the lens (e.g., the display member 201) on a line (e.g., to be level with the ground). As shown in FIG. 5C, based on the center coordinate of the eye of the user 500, the wearable device 200 according to an embodiment of the disclosure may project the angle (e.g., $\hat{e}_x$ and/or $\hat{e}_y$) formed by the center of the camera module 250 and the center (e.g., the third center 410a) of the first area 410 (e.g., light area) onto the lens (e.g., the display member 201). According to the function or operation, the coordinate of the center (e.g., the third center 410a) of the first area 410 (e.g., light area) may substantially become the same as the coordinate at the location (e.g., the first location 201b) determined on the lens (e.g., the display member 201), and illuminance information of the center (e.g., the third center 410a) of the first area 410 (e.g., light area) may be assigned to a location (e.g., the first location 201b) determined on the lens (e.g., the display member 201). As shown in FIG. 5D, the wearable device 200 according to yet another embodiment of the disclosure may equally perform the functions or operations described with reference to FIGS. 5A to 5C with respect to the plurality of areas (e.g., the first area (A) 410 and the second area (B) 420 identified as light parts and the third area (C) 430 identified as a dark part). Through the functions or operations, the coordinate of at least one arbitrary point (e.g., the third center 410*a*, the fourth center 420*a*, and the fifth center 430*a*) included in the first area 410 to the third area 430 may substantially become the same as the coordinate of the location (e.g., the first location 201*b*, the second location (i.e., left eye lens 201*c*), and the third location (i.e., right eye lens 201*d*)) determined on the lens (e.g., the display member 201), and thus, illuminance information of each of the plurality of areas (e.g., the first area (A) 410 and the second area (B) 420 identified as light parts, and the third area (C) 430 identified as a dark part) may be assigned to the lens (e.g., the display member 201). According to another embodiment of the disclosure, the wearable device 200 may directly project the angle (e.g., $\theta_x$ and/or $\theta_y$) formed by the center of the camera module 250 and the center (e.g., the third center 410*a*) of the first area 410 (e.g., light area) onto the lens (e.g., the display member 201) without identifying coordinate for the eyeball image of the user 500. According to yet another embodiment of the disclosure, when allocating the illuminance information of the acquired image 400 to the lens (e.g., the display member 201), the function or operation of acquiring an eyeball image and identifying coordinate for the acquired eyeball image may be omitted. According to yet another embodiment of the disclosure, a plurality of arbitrary points included in the first area 410, the second area 420, and the third area 430 may be provided, for example, the arbitrary points is included in the boundaries of the first area 410, the second area 420, and the third area 430. In this case, the wearable device 200 according to an embodiment of the disclosure may obtain coordinate information of the points included in the boundaries of the first area 410, the second area 420, and the third area 430, thereby identifying the sizes of the first area 410, the second area 420, and the third area 430.

Although FIGS. 5A to 5D illustrate, as examples, the case in which the lens (e.g., the display member 201) and/or the lens (e.g., an EC (electrochromic) lens) for adjusting light transmittance included in the lens (e.g., the display member 201) has a rectangular shape for convenience of description, according to various embodiments of the disclosure, the lens (e.g., the display member 201) and/or the lens (e.g., an EC (electrochromic) lens) for adjusting light transmittance included in the lens (e.g., the display member 201) may have various shapes (e.g., round or oval shape). Even in this case, various functions or operations according to an embodiment of the disclosure may be equally applied to the lens (e.g., the display member 201) and/or the lens (e.g., an EC lens) for adjusting light transmittance included in the lens (e.g., the display member 201) which are configured to have various shapes (e.g., round shape or the like).

Figure 6A:
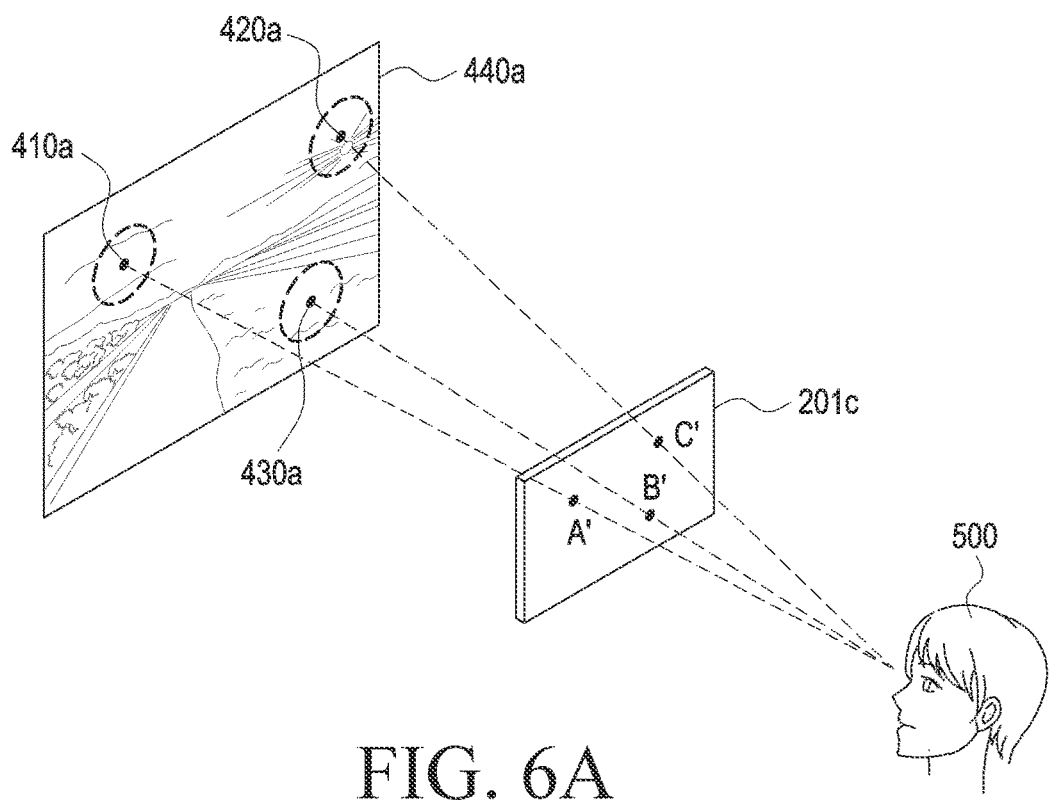
FIGS. 6A and 6B illustrate a function or operation of determining a location on at least one lens, light transmittance of which is to be adjusted based on an image obtained by one camera module, when a wearable device equipped with the one camera module according to various embodiments of the disclosure.
Figure 6B:
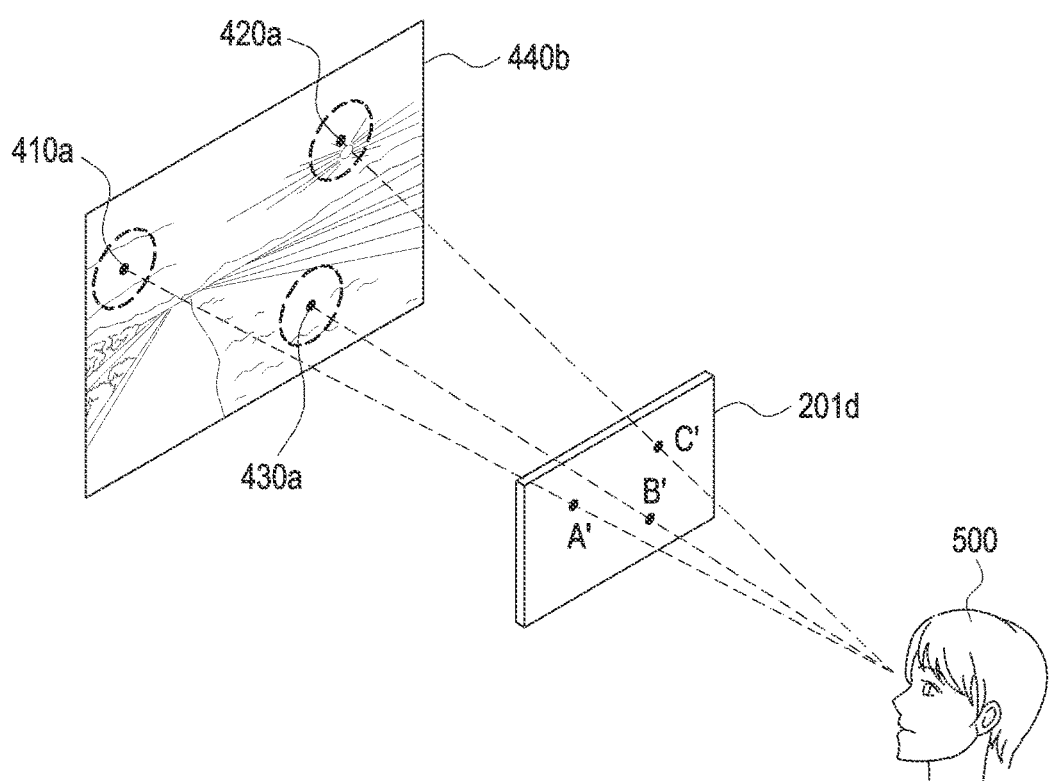

FIGS. 6A and 6B illustrates a function or operation of determining a location on at least one lens (e.g., the display member 201), light transmittance of which is to be adjusted based on an image obtained by one camera module (e.g., the second camera module 253), when the wearable device equipped with the one camera module (e.g., the second camera module) according to various embodiments of the disclosure.

Referring to FIGS. 6A and 6B, when the image 400 is acquired by one camera module (e.g., the second camera module 253), the wearable device 200 according to an embodiment of the disclosure may generate a left eye image 440*a* cropped except for a portion of the right area of the acquired image 400, and a right eye image 440*b* cropped except for a portion of the left area of the acquired image 400. According to an embodiment of the disclosure, the degree of cropping (e.g., the size of the portion of the right area and/or the portion of the left area) may be predetermined. As shown in FIG. 6A, the wearable device 200 according to an embodiment of the disclosure may perform the functions or operations described in FIGS. 5A to 5D by using the left eye image 440*a*. As shown in FIG. 6B, the wearable device 200 according to an embodiment of the disclosure may perform the functions or operations described in FIGS. 5A to 5D by using the right eye image 440*b*. Through these functions or operations, the wearable device 200 according to an embodiment of the disclosure may configure (e.g., assign the coordinate of the image 400 to a lens) each lens (e.g., the left eye lens 201*c* and/or the right eye lens 201*d*) such that the coordinates of the centers (e.g., the third center 410*a*, the fourth center 420*a*, and the fifth center 430*a*) of the first area 410 to the third area 430 correspond to specific locations (e.g., location A', location B', and/or location C') of the lens (e.g., the display member 201).

In operation 330, the wearable device 200 (e.g., the processor 120) according to an embodiment of the disclosure may determine an average illuminance of an image, based on the illuminance information corresponding to the location determined according to operation 320. The wearable device 200 according to an embodiment of the disclosure may identify an illuminance value (e.g., 200 (lux) as the illuminance value for location A', 300 (*lux*) as the illuminance value for location B', and 10 (lux) as the illuminance value for location C') corresponding to the position (e.g., location A', location B', and/or location C) according to operation 320, based on the illuminance information of the acquired image 400. The wearable device 200 according to an embodiment of the disclosure may determine an average illuminance value (e.g., 170 (lux)), based on the identified illuminance value. The wearable device 200 according to an embodiment of the disclosure may determine the total light transmittance of at least one lens (e.g., the display member 201), based on the determined average illuminance value (e.g., 170 (lux)). The wearable device 200 according to an embodiment of the disclosure may determine the total light transmittance of at least one lens (e.g., the display member 201) by using the look-up table providing the defined relationship between an illuminance value and light transmittance, stored in the wearable device 200 or obtained from an external electronic device (e.g., a server). According to another embodiment of the disclosure, when the current average illuminance value (e.g., 170 (lux)) is a relatively higher illuminance value than the previous average illuminance value, the at least one lens (e.g., the display member 201) may be controlled to have a lower light transmittance than the previous light transmittance (e.g., the light transmittance at a time point before a specific time interval from the time point at which the image 400 corresponding to the current user's gaze is acquired by at least one camera (e.g., the second camera module 253)). According to yet another embodiment of the disclosure, when the current average illuminance value (e.g., 170 (lux)) is a relatively lower illuminance value than the previous average illuminance value, the at least one lens (e.g., the display member 201) may be controlled to have a higher light transmittance than the previous light transmittance (e.g., the light transmittance at a time point before a specific time interval from the time point at which the image 400 corresponding to the current user's gaze is acquired by at least one camera (e.g., the second camera module 253)).

In operation 340, the wearable device 200 (e.g., the processor 120) according to an embodiment of the disclosure may compare the illuminance information corresponding to the location determined according to operation 320 with the average illuminance. The wearable device 200 according to an embodiment of the disclosure may compare the illuminance value (e.g., 200 (lux) as the illuminance value for location A', 300 (lux) as the illuminance value for location B', and 10 (lux) as the illuminance value for location C') corresponding to the location (e.g., location A', location B', and/or location C') determined according to operation 320 with an average illuminance value (e.g., 170 (lux)). Operation 340 according to an embodiment of the disclosure may be performed after the total light transmittance of the at least one lens (e.g., the display member 201) is adjusted.

In operation 350, the wearable device 200 (e.g., the processor 120) according to an embodiment of the disclosure may adjust light transmittance of the part of the at least one lens (e.g., the display member 201), based on the result of the comparison according to operation 340. The wearable device 200 according to an embodiment of the disclosure may adjust light transmittance of the part of the at least one lens (e.g., an EC lens included in the display member 201), based on the look-up table in which the reduction ratio of light transmittance according to the difference in illuminance value is defined. For example, when the difference in illuminance value is +30 (lux), light transmittance of the part of the at least one lens (e.g., the display member 201) is adjusted such that the light transmittance is reduced by 5% from the current light transmittance (e.g., apply a voltage 5% greater than the voltage currently applied to electrodes). The wearable device 200 according to an embodiment of the disclosure may adjust light transmittance in a designated area (e.g., a rectangular area having location A' as the center and having a specified horizontal and vertical length) including a location on the at least one lens (e.g., the display member 201) determined according to operation 320. Alternatively, according to another embodiment of the disclosure, when the size of the area of a light part (e.g., the first area 410 and the second area 420) or a dark part (e.g., the third area 430) is recognized, the wearable device 200 may also adjust the light transmittance of a part including an area on at least one lens (e.g., the display member 201) corresponding to the size of an area of the light part (e.g., the first area 410 and second area 420) or the dark part (e.g., the third area 430).

Figure 7:
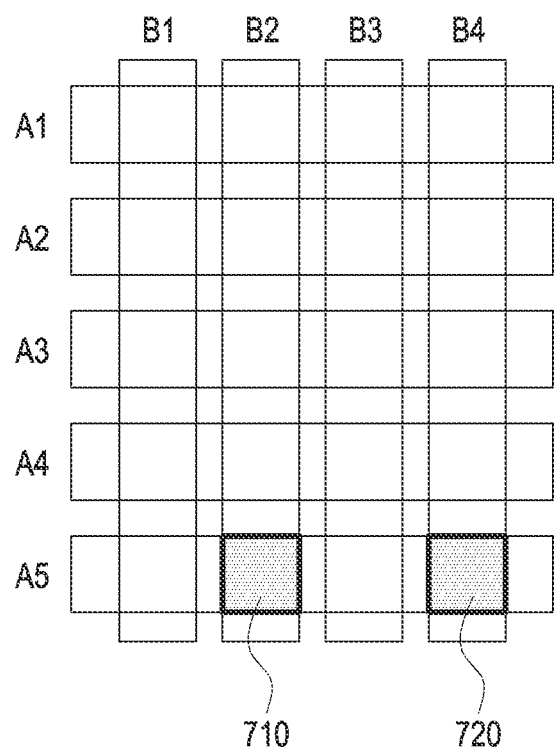
FIG. 7 illustrates a principle in which light transmittance of a part of at least one lens included in a wearable device is adjusted according to an embodiment of the disclosure.

FIG. 7 illustrates a principle in which light transmittance of the part of at least one lens (e.g., an EC lens included in the display member 201) included in the wearable device is adjusted according to an embodiment of the disclosure.

Referring to FIG. 7, the wearable device 200 (e.g., the processor 120) according to an embodiment of the disclosure may control the voltage applied to a designated area by using a plurality of electrodes (e.g., A1 to A5, B1 to B4), thereby reducing or increasing the light transmittance in the designated area. The wearable device 200 according to an embodiment of the disclosure may apply designated voltages to electrodes A5 and B2 to change the light transmittance in a designated area (e.g., the fourth area 710). The wearable device 200 according to an embodiment of the disclosure may apply designated voltages to electrodes A5 and B4 to change the light transmittance in a designated area (e.g., the fifth area 720). According to an embodiment of the disclosure, a relatively high voltage may be applied to designated electrodes to reduce light transmittance in a designated area, and a relatively low voltage may be applied to designated electrodes to increase light transmittance in a designated area. The wearable device 200 according to an embodiment of the disclosure may apply voltages to designated electrodes, based on a look-up table in which the relationship between light transmittance and voltage is defined. At least one lens (e.g., the display member 201) according to an embodiment of the disclosure may include an LCD. In regard to the LCD included in at least one lens according to an embodiment of the disclosure, an LCD having a structure of "polarizing plate—glass—TFT—liquid crystal—glass—polarizing plate" may be included in the at least one lens. The wearable device 200 according to an embodiment of the disclosure may adjust the light transmittance by adjusting the level of the voltage applied to a liquid crystal. In this case, as in the case of the EC lens, the wearable device 200 may apply a voltage to the liquid crystal at a designated location, based on the look-up table in which the relationship between light transmittance and voltage is defined. According to the functions or operations, the light transmittance the part of at least one lens (e.g., the display member 201) included in the wearable device 200 may be controlled (e.g., control the lens such that the light transmittance of the part of the lens corresponding to the high-illuminance area on the captured image is reduced and the light transmittance of the part of the lens corresponding to the low-illuminance area on the captured image is increased), based on the location of an external light source (e.g. a real object), thereby improving the visibility of an external object or a virtual object viewed by the user 500 through the wearable device 200.

In the wearable device 200 according to an embodiment of the disclosure, there may be a case in which illuminance of a designated location (e.g., location B') is still high (e.g., a case in which illuminance at a designated location (e.g., location B') exceeds the designated threshold illuminance value) even after the function or operation related to operation 350 is performed. In this case, the wearable device 200 according to an embodiment of the disclosure may further adjust (e.g., reduce) the light transmittance at the designated location (e.g., location B').

The wearable device 200 according to an embodiment of the disclosure may detect a movement of the user's gaze or a motion of a part (e.g., a head wearing the wearable device 200) of the user's body during performance of a function or action related to operation 350. In this case, the location determined according to operation 320 (e.g., location A', location B', and/or location C') may be moved based on a movement direction and a movement speed of the gaze of the user 500. The wearable device 200 according to an embodiment of the disclosure may identify the movement direction and the movement speed of the gaze of the user 500 by analyzing images obtained from at least one camera (e.g., the first camera module 251) configured to capture the gaze of the user 500. The wearable device 200 according to an embodiment of the disclosure may determine a movement direction and a movement speed of the user's gaze or a motion of a part (e.g., a head wearing the wearable device 200) of the user's body, based on a value sensed by a sensor (e.g., an IMU sensor, an acceleration sensor, and/or a gyro sensor) provided in the wearable device 200. According to an embodiment of the disclosure, the function or operation may be equally applied even when an external light source moves.

Figure 8:
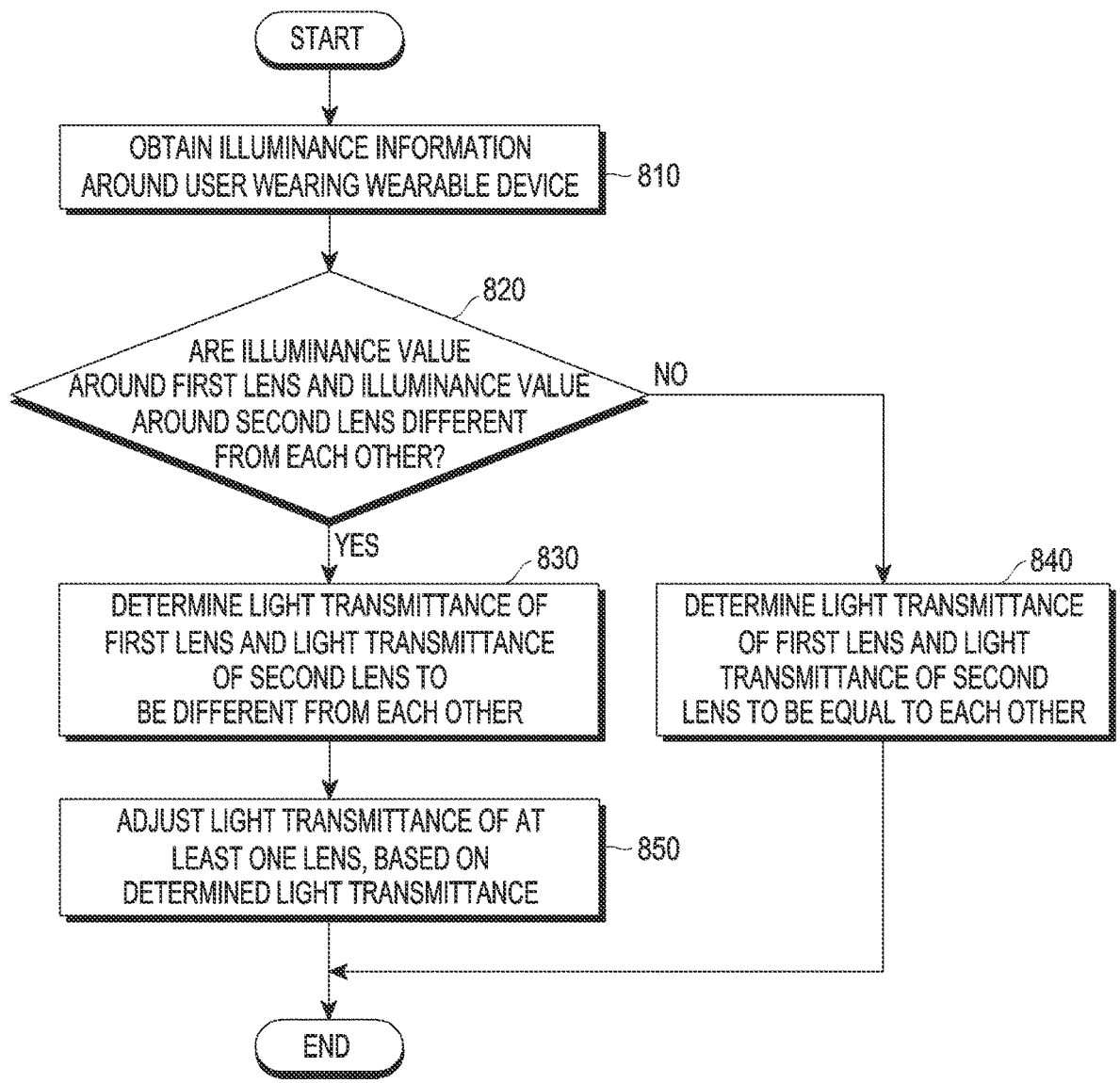
FIG. 8 illustrates a function or operation of differently adjusting light transmittance of a first lens and a second lens included in a wearable device, based on peripheral illuminance of the wearable device according to an embodiment of the disclosure.

FIG. 8 illustrates a function or operation of differently adjusting light transmittance of a first lens (e.g., the left eye lens 201c) and a second lens (e.g., the right eye lens 201d) included in the wearable device, based on peripheral illuminance of the wearable device according to an embodiment of the disclosure.

Referring to FIG. 8, in operation 810, the wearable device 200 (e.g., the processor 120) according to an embodiment of the disclosure may obtain illuminance information around the user 500 wearing the wearable device 200. The wearable device 200 according to an embodiment of the disclosure may include at least one illuminance sensor around a first lens (e.g., the left eye lens 201c), and may include at least one illuminance sensor around a second lens (e.g., the right eye lens 201d). The wearable device 200 according to an embodiment of the disclosure may obtain illuminance information (e.g., illuminance information around the left eye lens 201c and illuminance information around the right eye lens 201d) around the user 500 wearing the wearable device 200 by using the illuminance sensing data obtained by the plurality of illuminance sensors. When the wearable device 200 according to an embodiment of the disclosure includes a plurality of cameras (e.g., the second camera module 253 disposed around the left eye lens 201c and the second camera module 253 disposed around the right eye lens 201d), the wearable device 200 may obtain illuminance information (e.g., illuminance information around the left eye lens 201c and illuminance information around the right eye lens 201d) around the user 500 wearing the wearable device 200, based on the histogram of each image photographed by the plurality of cameras.

In operation 820, the wearable device 200 according to an embodiment of the disclosure may determine whether an illuminance value around the first lens (e.g., the left eye lens 201c) and an illuminance value around the second lens (e.g., the right eye lens 201d) are different from each other. The wearable device 200 according to an embodiment of the disclosure may determine whether the illuminance value around the first lens (e.g., the left eye lens 201c) and the illuminance value around the second lens (e.g., the right eye lens 201d) are different from each other, based on whether the difference between the illuminance value around the first lens (e.g., the left eye lens 201c) and the illuminance value around the second lens (e.g., the right eye lens 201d) exceeds a threshold illuminance value.

When the illuminance value around the first lens (e.g., the left eye lens 201c) and the illuminance value around the second lens (e.g., the right eye lens 201d) are different from each other, in operation 830, the wearable device 200 according to an embodiment of the disclosure may determine the light transmittance of the first lens (e.g., the left eye lens 201c) and the light transmittance of the second lens (e.g., the right eye lens 201d) to be different from each other. The wearable device 200 according to an embodiment of the disclosure may determine the light transmittance of the first lens (e.g., the left eye lens 201c) and the light transmittance of the second lens (e.g., the right eye lens 201d) to be different from each other, based on the look-up table (e.g., the look-up table in which the relationship between light transmittance and voltage is defined). In operation 850, the wearable device 200 according to an embodiment of the disclosure may adjust light transmittance of at least one lens (e.g., the left eye lens 201c and/or the right eye lens 201d), based on the light transmittance determined according to operation 830.

When the illuminance value around the first lens (e.g., the left eye lens 201c) and the illuminance value around the second lens (e.g., the right eye lens 201d) are equal to each other (e.g., operation 820-No), in operation 840, the wearable device 200 according to an embodiment of the disclosure may determine the light transmittance of the first lens (e.g., the left eye lens 201c) and the light transmittance of the second lens (e.g., the right eye lens 201d) to be equal to each other. The wearable device 200 according to an embodiment of the disclosure may determine the light transmittance of the first lens (e.g., the left eye lens 201c) and the light transmittance of the second lens (e.g., the right eye lens 201d) to be equal to each other, based on the look-up table (e.g., the look-up table in which the relationship between light transmittance and voltage is defined). In operation 850, the wearable device 200 according to an embodiment of the disclosure may adjust light transmittance of at least one lens (e.g., the left eye lens 201c and/or the right eye lens 201d), based on the light transmittance determined according to operation 830.

The wearable device 200 according to an embodiment of the disclosure may configure the light transmittance of at least one lens (e.g., the display member 201) corresponding to an area in which a virtual object is displayed, to be lower than the light transmittance of other areas in the at least one lens (e.g., the display member 201). The wearable device 200 according to an embodiment of the disclosure may also identify a location on the at least one lens (e.g., the display member 201) corresponding to the area in which the virtual object is displayed, because the coordinate (e.g., the coordinate within a designated viewing angle) at which the virtual object is viewed in the real world is recognized by the wearable device 200. The wearable device 200 according to an embodiment of the disclosure may control (e.g., apply a designated voltage) the at least one lens (e.g., the display member 201) such that the light transmittance at the identified location on the at least one lens (e.g., the display member 201) is lower than the light transmittance of other portions of the lens by a designated ratio.

Figure 9:
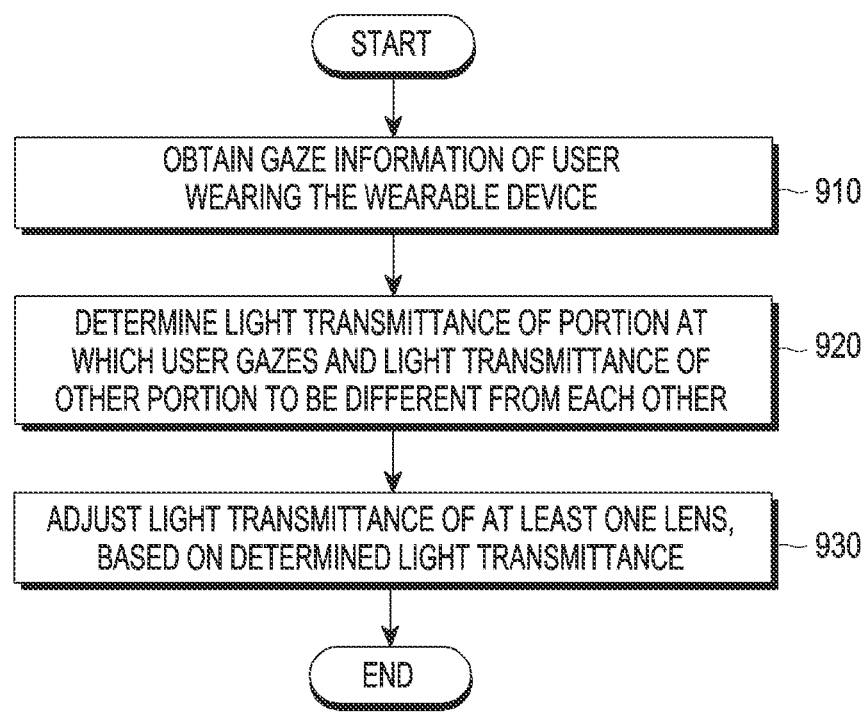
FIG. 9 illustrates a function or operation of adjusting light transmittance of at least one lens included in a wearable device, based on a gaze of a user wearing the wearable device according to an embodiment of the disclosure.

FIG. 9 illustrates a function or operation of adjusting light transmittance of at least one lens (e.g., the display member 201) included in the wearable device, based on the gaze of the user wearing the wearable device according to an embodiment of the disclosure.

Referring to FIG. 9, the wearable device 200 (e.g., the processor 120) according to an embodiment of the disclosure may obtain, in operation 910, gaze information of the user 500 wearing the wearable device 200. The wearable device 200 according to an embodiment of the disclosure may obtain gaze information of the user 500 wearing the wearable device 200 by using at least one camera (e.g., the first camera module 251) provided in the wearable device 200.

In operation 920, the wearable device 200 according to an embodiment of the disclosure may determine the light transmittance of a portion at which the user 500 gazes and the light transmittance of the other portion to be different from each other. In operation 930, the wearable device 200 according to an embodiment of the disclosure may adjust the light transmittance of at least one lens (e.g., the display member 201), based on the light transmittance determined according to operation 920. The wearable device 200 according to an embodiment of the disclosure may identify a direction in which the user gazes at a real object, by using the at least one camera (e.g., the first camera module 251) provided in the wearable device 200. When it is identified that the user 500 is looking at the lower right corner of the lens (e.g., the display member 201), the wearable device 200 according to an embodiment of the disclosure may control the lens (e.g., the display member 201) such that the light transmittance of an area of the lower right corner of a lens (e.g., the display member 201), which has a designated size, is lower than the light transmittance of other portions of the lens (e.g., the first lens 201c and/or the second lens 201d as the display member 201) by a designated ratio. Alternatively, the wearable device 200 according to an embodiment of the disclosure may identify a location on the image 400 of a real object at which the user 500 gazes, based on the image 400 obtained by at least one camera (e.g., the second camera module 253) and may determine a location of the lens (e.g., the first lens 201*c* and/or the second lens 201*d* as the display member 201) corresponding to the location of the real object at which the user 500 gazes, based on the functions or operations related to FIGS. 5A to 5D. The wearable device 200 according to an embodiment of the disclosure may control the lens (e.g., the display member 201) such that the light transmittance of the determined location of the lens (e.g., the first lens 201*c* and/or the second lens 201*d* as the display member 201) is lower than those of other portions of the lens by a designated ratio.

A wearable device (e.g., the wearable device 200) according to an embodiment of the disclosure may comprise at least one camera (e.g., the camera module 250), at least one lens (e.g., the display member 201), and at least one processor (e.g., processor 120), wherein the at least one processor may be configured to identify illuminance information of an image obtained through the at least one camera, determine a location on the at least one lens, based on the identified illuminance information, the location corresponding to the illuminance information, determine an average illuminance of the image, based on the illuminance information corresponding to the determined location, and compare the illuminance information corresponding to the determined location with the average illuminance, and adjust light transmittance of the part of the at least one lens, based on a result of the comparison.

The wearable device (e.g., the wearable device 200) according to an embodiment of the disclosure may be further configured to identify coordinate corresponding to the illuminance information of the image on the image. The wearable device (e.g., the wearable device 200) according to an embodiment of the disclosure may be further configured to determine a location on the at least one lens, corresponding to the illuminance information, based on a location of an eyeball of a user wearing the wearable device and a location of a dark part or a light part, the dark part or the light part is identified based on the image with the identified coordinate corresponding to the illuminance information. The wearable device (e.g., the wearable device 200) according to an embodiment of the disclosure may be further configured to, before adjusting the light transmittance of the part of the at least one lens, adjust the light transmittance of the at least one lens overall, based on the determined average illuminance. The at least one lens may include an electrochromic (EC) lens or a liquid crystal display (LCD). The wearable device (e.g., the wearable device 200) according to an embodiment of the disclosure may be further configured to, when the light part or the dark part is identified to have been moved, move the location corresponding the illuminance information, based on a movement direction and movement speed of the light part or the dark part. The wearable device (e.g., the wearable device 200) according to an embodiment of the disclosure may be further configured to, when the at least one lens includes a first lens corresponding to the left eye of the user of the wearable device and a second lens corresponding to the right eye of the user, determine whether light transmittance of the first lens and light transmittance of the second lens are different from each other, and determine the light transmittance of the first lens and the light transmittance of the second lens to be different from each other, based on the determined result. The wearable device (e.g., the wearable device 200) according to an embodiment of the disclosure may be further configured to determine light transmittance of a location on the at least one lens corresponding to a display location of a virtual object viewed to the user through the wearable device to be lower than light transmittance of other portions of the at least one lens. The wearable device (e.g., the wearable device 200) according to an embodiment of the disclosure may be further configured to track gaze of the user wearing the wearable device, and adjust light transmittance of the at least one lens according to the gaze of the user. The wearable device (e.g., the wearable device 200) according to an embodiment of the disclosure may be further configured to generate a plurality of images corresponding to the first lens and the second lens, based on the image, and determine a location corresponding to the illuminance information, based on the generated plurality of images.

A method for controlling the wearable device 200 according to an embodiment of the disclosure may comprise identifying illuminance information of an image obtained through at least one camera of the wearable device, determining a location on at least one lens of the wearable device, based on the identified illuminance information, the location corresponding to the illuminance information, determining an average illuminance of the image, based on the illuminance information corresponding to the determined location, comparing the illuminance information corresponding to the determined location with the average illuminance, and adjusting light transmittance of the part of the at least one lens, based on a result of the comparison.

The method for controlling the wearable device according to an embodiment of the disclosure may further include identifying coordinating corresponding to the illuminance information of the image on the image. The method for controlling the wearable device according to an embodiment of the disclosure may further include determining a location on the at least one lens, corresponding to the illuminance information, based on a location of an eyeball of a user wearing the wearable device and a location of a dark part or a light part, the dark part or the light part is identified based on the image with the identified coordinate corresponding to the illuminance information. The method for controlling the wearable device according to an embodiment of the disclosure may further include, before adjusting the light transmittance of the part of the at least one lens, adjusting the light transmittance of the at least one lens overall, based on the determined average illuminance. The at least one lens according to an embodiment of the disclosure may include an electrochromic (EC) lens or a liquid crystal display (LCD). The method for controlling the wearable device according to an embodiment of the disclosure may further include, when the light part or the dark part is identified to have been moved, moving the location corresponding the illuminance information, based on a movement direction and movement speed of the light part or the dark part. The method for controlling the wearable device according to an embodiment of the disclosure may further include, when the at least one lens includes a first lens corresponding to the left eye of the user of the wearable device and a second lens corresponding to the right eye of the user, determining whether light transmittance of the first lens and light transmittance of the second lens are different from each other, and determining the light transmittance of the first lens and the light transmittance of the second lens to be different from each other, based on the determined result. The method for controlling the wearable device according to an embodiment of the disclosure may further include determining light transmittance of a location on the at least one lens corresponding to a display location of a virtual object viewed to the user through the wearable device to be lower than light transmittance of other portions of the at least one lens. The method for controlling the wearable device according to an embodiment of the disclosure may further include tracking gaze of the user wearing the wearable device, and adjusting light transmittance of the at least one lens according to the gaze of the user. The method for controlling the wearable device according to an embodiment of the disclosure may further include generating a plurality of images corresponding to the first lens and the second lens, based on the image, and determining a location corresponding to the illuminance information, based on the generated plurality of images. The method for controlling the wearable device according to an embodiment of the disclosure may further include recognizing, using the at least one camera, visual images of an object or an environment in a direction in which a user looks or the wearable device is directed. The method for controlling the wearable device according to an embodiment of the disclosure may further include providing information on the object or the environment to the user in a sound or a visual form. The method for controlling the wearable device according to an embodiment of the disclosure may further include providing, using a display, the information on the object or the environment to the user through the display member in a visual form by using a display module.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
   at least one camera;
   at least one lens; and
   at least one processor,
   wherein the at least one processor is configured to:
      identify illuminance information of an image obtained through the at least one camera,
      determine a location on the at least one lens, based on the identified illuminance information, the location corresponding to the illuminance information,
      determine an average illuminance of the image, based on the illuminance information corresponding to the determined location,
      compare the illuminance information corresponding to the determined location with the average illuminance, and
      adjust light transmittance of a part of the at least one lens, based on a result of the comparison.

2. The wearable device of claim 1, wherein the at least one processor is further configured to identify coordinate corresponding to the illuminance information of the image on the image.

3. The wearable device of claim 1, wherein the at least one processor is further configured to determine a location on the at least one lens, corresponding to the illuminance information, based on a location of an eyeball of a user wearing the wearable device and a location of a dark part or a light part, the dark part or the light part is identified based on the image with the identified coordinate corresponding to the illuminance information.

4. The wearable device of claim 1, wherein the at least one processor is further configured to, before adjusting the light transmittance of the part of the at least one lens, adjust the light transmittance of the entirety of the at least one lens, based on the determined average illuminance.

5. The wearable device of claim 1, wherein the at least one lens comprises an electrochromic (EC) lens or a liquid crystal display (LCD).

6. The wearable device of claim 1, wherein the at least one processor is further configured to, in case that a light part or a dark part is identified to have been moved, move the location corresponding the illuminance information, based on a movement direction and movement speed of the light part or the dark part.

7. The wearable device of claim 1, wherein the at least one processor is further configured to:
   in case that the at least one lens comprises a first lens corresponding to a left eye of a user of the wearable device and a second lens corresponding to a right eye of the user, determine whether light transmittance of the first lens and light transmittance of the second lens are different from each other, and
   determine the light transmittance of the first lens and the light transmittance of the second lens to be different from each other, based on a result of the determination.

8. The wearable device of claim 1, wherein the at least one processor is further configured to determine light transmittance of a location on the at least one lens corresponding to a display location of a virtual object viewed to a user through the wearable device to be lower than light transmittance of other portions of the at least one lens.

9. The wearable device of claim 1, wherein the at least one processor is further configured to:
   track a gaze of a user wearing the wearable device, and
   adjust the light transmittance of the at least one lens according to the gaze of the user.

10. The wearable device of claim 1, wherein the at least one processor is further configured to:
    generate a plurality of images corresponding to a first lens and a second lens, based on the image, and
    determine a location corresponding to the illuminance information, based on the generated plurality of images.

11. A method for controlling a wearable device, the method comprising:
    identifying illuminance information of an image obtained through at least one camera of the wearable device;
    determining a location on at least one lens of the wearable device, based on the identified illuminance information, the location corresponding to the illuminance information;
    determining an average illuminance of the image, based on the illuminance information corresponding to the determined location;
    comparing the illuminance information corresponding to the determined location with the average illuminance; and
    adjusting light transmittance of a part of the at least one lens, based on a result of the comparison.

12. The method of claim 11, further comprising:
    identifying coordinating corresponding to the illuminance information of the image on the image.

13. The method of claim 11, further comprising:
    determining a location on the at least one lens, corresponding to the illuminance information, based on a location of an eyeball of a user wearing the wearable device and a location of a dark part or a light part, the dark part or the light part is identified based on the image with the identified coordinate corresponding to the illuminance information.

14. The method of claim 11, further comprising:
    before adjusting the light transmittance of the part of the at least one lens, adjusting the light transmittance of the entirety of the at least one lens, based on the determined average illuminance.

15. The method of claim 11, wherein the at least one lens comprises an electrochromic (EC) lens or a liquid crystal display (LCD).

16. The method of claim 11, further comprising:
    in case that a light part or a dark part is identified to have been moved, moving the location corresponding the illuminance information, based on a movement direction and movement speed of the light part or the dark part.

17. The method of claim 11, further comprising:
    in case that the at least one lens comprises a first lens corresponding to a left eye of a user of the wearable device and a second lens corresponding to a right eye of the user, determining whether light transmittance of the first lens and light transmittance of the second lens are different from each other; and
    determining the light transmittance of the first lens and the light transmittance of the second lens to be different from each other, based on a result of the determination.

18. The method of claim 11, further comprising:
    determining light transmittance of a location on the at least one lens corresponding to a display location of a virtual object viewed to a user through the wearable device to be lower than light transmittance of other portions of the at least one lens.

19. The method of claim 11, further comprising:
tracking a gaze of a user wearing the wearable device; and
adjusting the light transmittance of the at least one lens according to the gaze of the user.

20. The method of claim 11, further comprising:
generating a plurality of images corresponding to a first lens and a second lens, based on the image; and
determining a location corresponding to the illuminance information, based on the generated plurality of images.

* * * * *